May 12, 1959 W. P. GALLAGHER ET AL 2,886,106
TIMING MECHANISM
Filed June 1, 1954 9 Sheets-Sheet 1
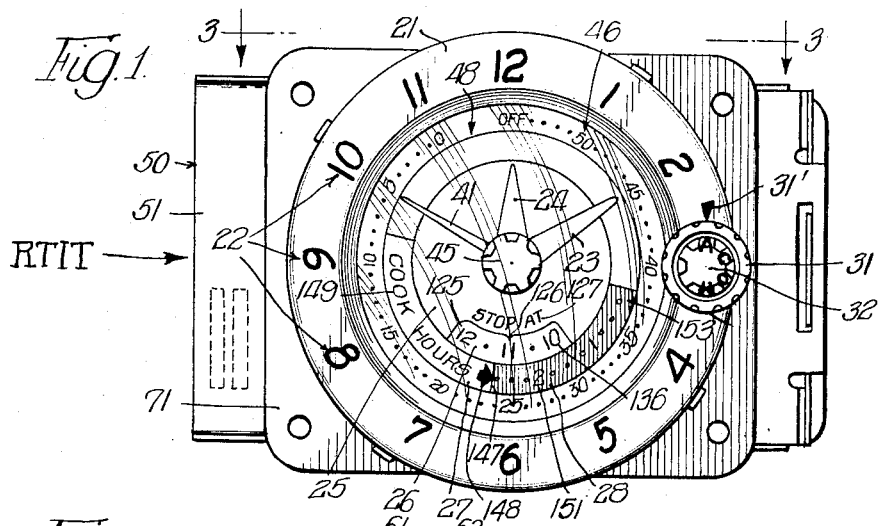
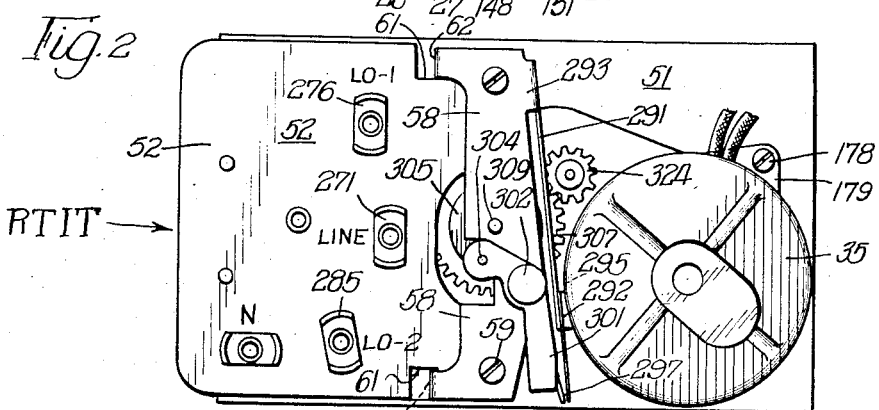
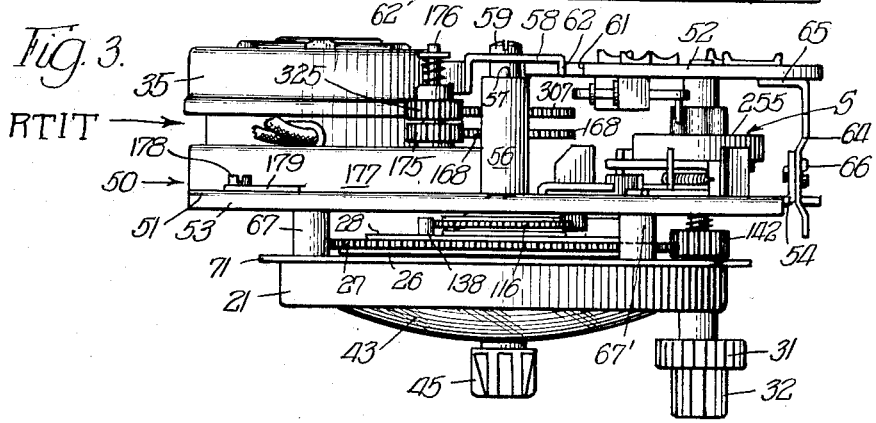
INVENTORS.
William P. Gallagher,
Anthony Dan Stolle,
Donald E. Schroeder,
By Brown, Jackson, Boettcher + Drenner
Attys.

May 12, 1959 W. P. GALLAGHER ET AL 2,886,106
TIMING MECHANISM
Filed June 1, 1954 9 Sheets-Sheet 2

INVENTORS.
William P. Gallagher,
Anthony Dan Stolle,
Donald E. Schroeder,
By Brown, Jackson, Boettcher & Dienner
Attys.

May 12, 1959 W. P. GALLAGHER ET AL 2,886,106
TIMING MECHANISM
Filed June 1, 1954 9 Sheets-Sheet 3

INVENTORS
William P. Gallagher,
Anthony Dan Stolle,
Donald E. Schroeder,
By Brown, Jackson, Boettcher & Dienner
Attys.

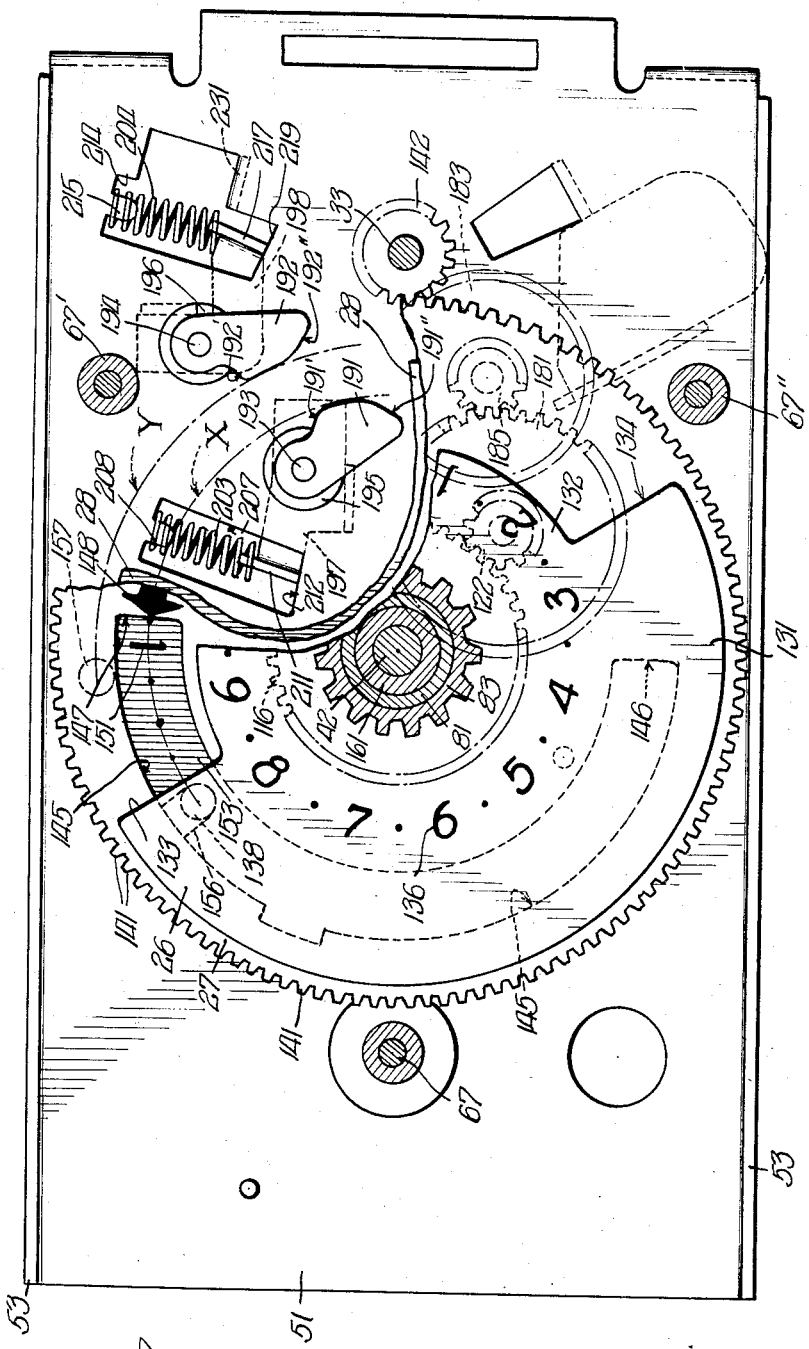

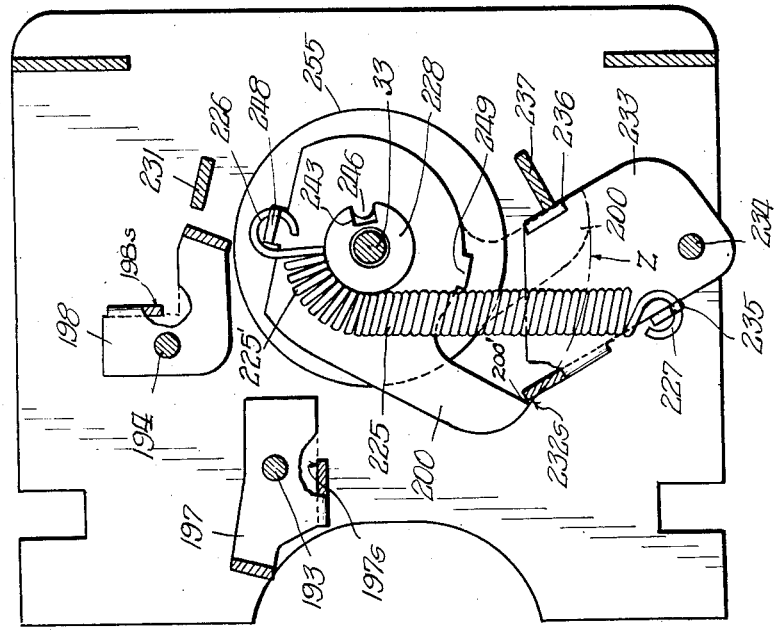
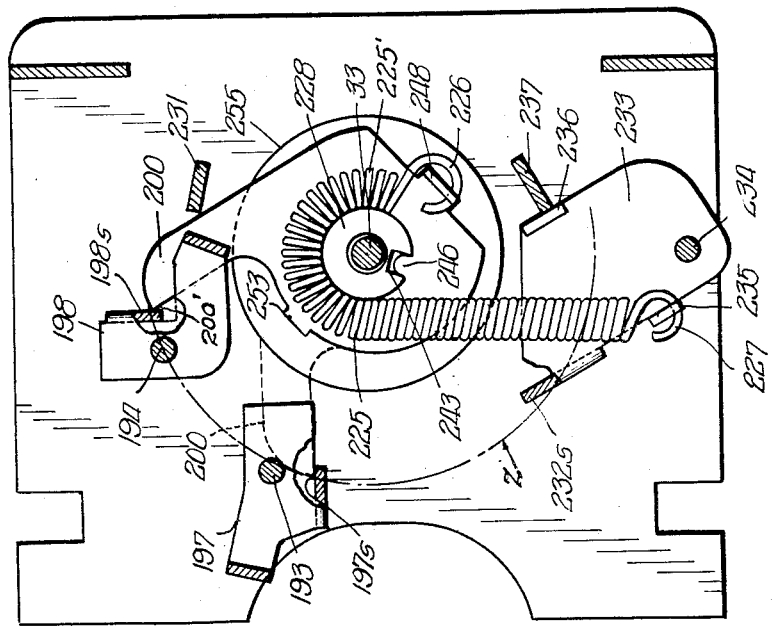

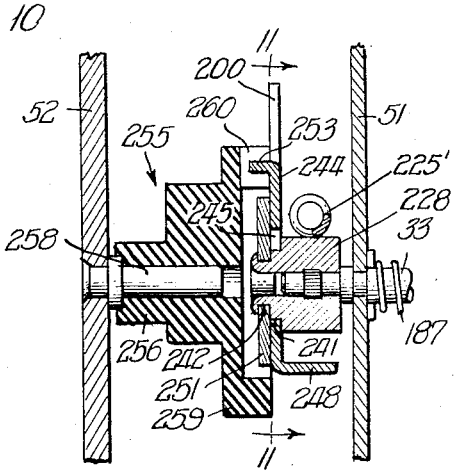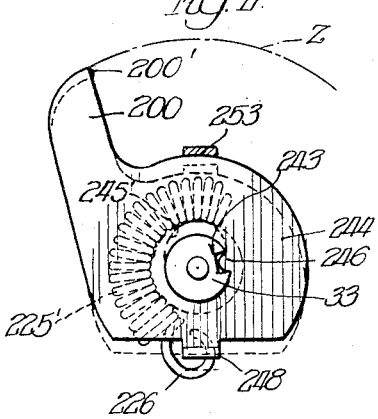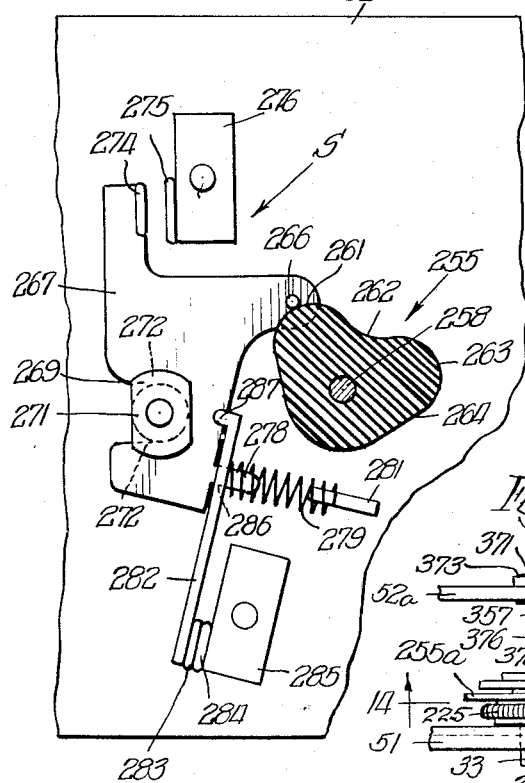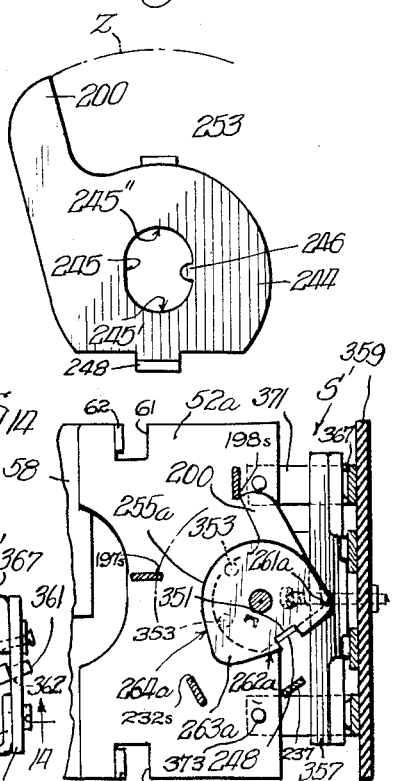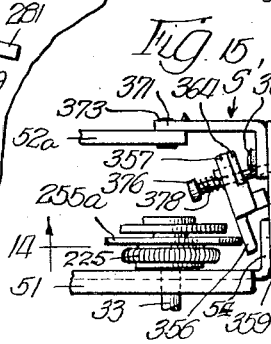

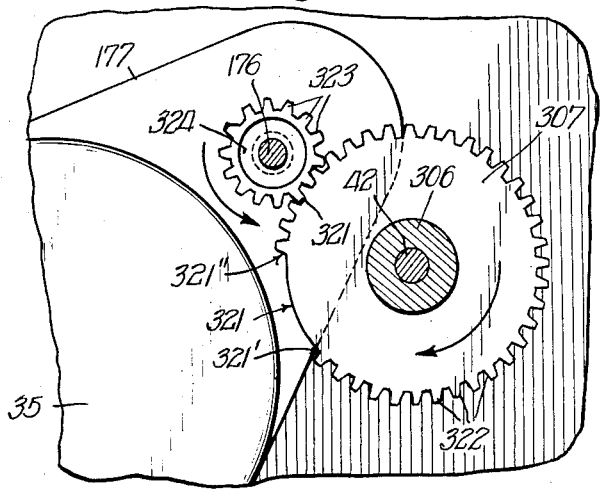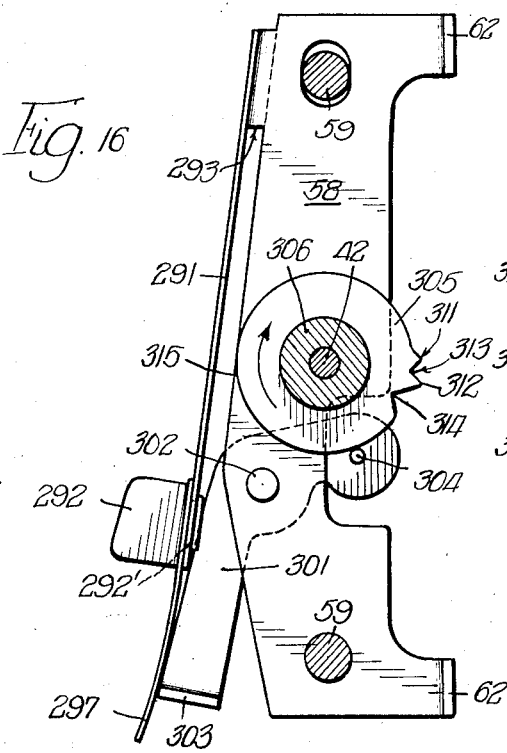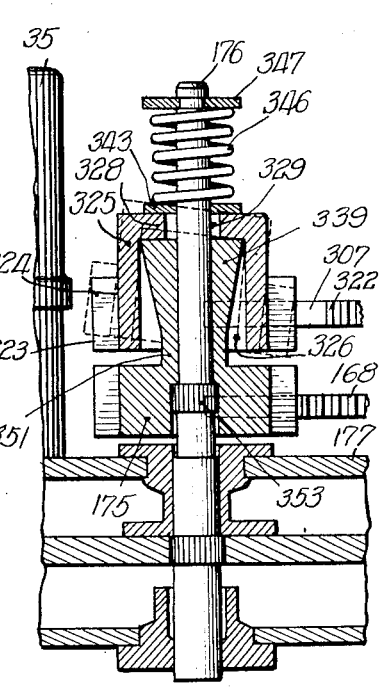

May 12, 1959 W. P. GALLAGHER ET AL 2,886,106
TIMING MECHANISM
Filed June 1, 1954 9 Sheets-Sheet 8
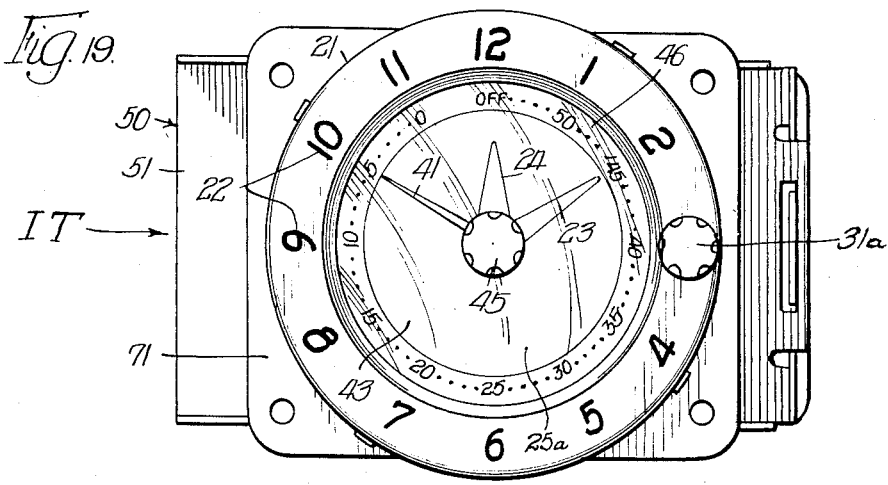
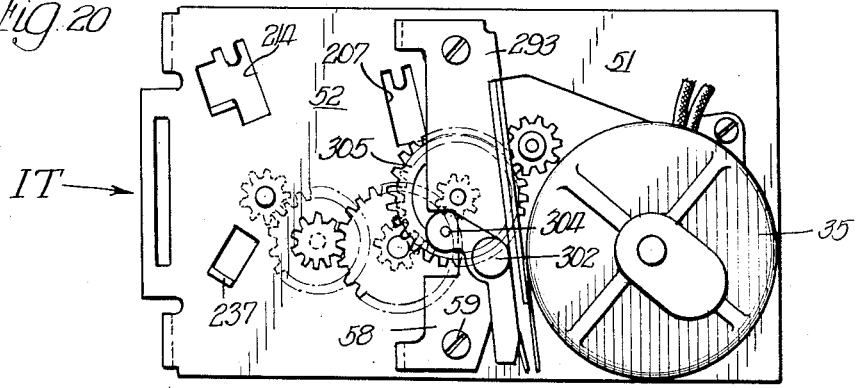
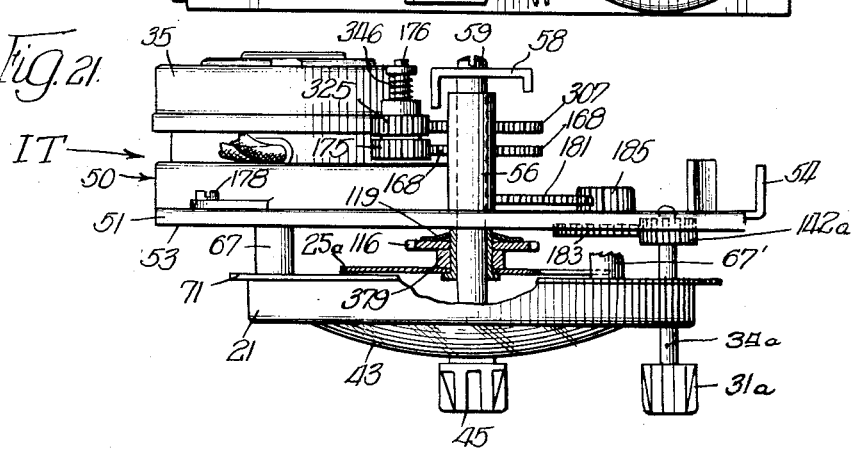
INVENTORS.
William P. Gallagher,
Anthony Dan Stolle,
Donald E. Schroeder,
By Brown, Jackson, Boettcher & Dienner
attys.

May 12, 1959 W. P. GALLAGHER ET AL 2,886,106
TIMING MECHANISM
Filed June 1, 1954 9 Sheets-Sheet 9

INVENTORS.
William P. Gallagher,
Anthony Dan Stolle,
Donald E. Schroeder,
By Brown, Jackson, Boettcher & Dienner
Attys United States Patent Office 2,886,106
Patented May 12, 1959

2,886,106
TIMING MECHANISM

William P. Gallagher, Anthony Dan Stolle, and Donald E. Schroeder, Chicago, Ill., assignors to International Register Company, Chicago, Ill., a corporation of Illinois Application June 1, 1954, Serial No. 433,426

20 Claims. (Cl. 161—1)

The present invention relates to improvements in timing mechanisms, such as automatic time switches, interval timers and the like.

One of the main features of the invention resides in providing a synchronous motor driven clock mechanism as a basic assembly, with which can be combined either an automatic time switch, or an interval timer, or both, as manufacturing or sales needs indicate. In the preferred or first exemplary embodiment herein disclosed, we have shown the invention in the form of a combination unit embodying both a range timer and an interval timer; the range timer being of the type for automatically controlling electric cooking ranges, gas cooking ranges, electric ovens and the like, whereby the housewife can set the range timer to result in a cooking operation of predetermined time interval ending at a preselected time; and the interval timer being of the type which can be manually preset to sound an audible signal or to perform a control function upon the expiration of a predetermined time interval.

Referring first to the automatic time switch or range timer mechanism, one of the objects of the invention is to obtain greater accuracy of timing in the automatic closing and the automatic opening of the electrical switch of the timer. In the range timer embodiment, the automatic closing of this switch to start the cooking operation, and the automatic opening of the switch to stop the cooking operation should agree as closely as possible to the preselected times which the housewife has set up on the range timer in the manual presetting operation. In some of the automatic range timers heretofore in use, there may be errors as large as a quarter-hour or half-hour, either in the closing of the switch or in the opening of the switch, or both; and if the particular cooking operation taking place at that time happens to be one of normally short duration, such error or errors may result in a faulty cooking operation, particularly if such errors happen to be cumulative. For example, a cooking operation which is intended to be of 60 minutes' duration can be accidentally reduced to 30 minutes' duration if timing errors in the mechanism should result in the switch closing 15 minutes later than the preselected time and should cause the switch to open 15 minutes ahead of the preselected time. In the construction herein disclosed, the timing accuracy of the device is approximately as accurate as the human element in the setting of the device, i.e. approximately as accurate as the time settings which the housewife sets up on the indicating elements of the timer. In our new design of range timer herein disclosed, we obtain a substantially greater degree of automatic timing accuracy by virtue of a new and improved construction of tripping mechanism for controlling the time tripping of the electric switch. The switch contacts are closed and opened by cam apparatus moving with a switch actuating control shaft which is spring biased to rotate with a step-by-step movement from a preset automatic position to a normal manual position. Projecting from this switch actuating shaft is a control arm arranged whereby the spring biased return motion of the switch actuating shaft and control arm is intercepted at successive angularly spaced points by successive tripping stops. In our improved construction, one tripping stop is provided to time the automatic closing of the switch, and another tripping stop is provided to time the automatic opening of the switch. These two separate tripping stops are mounted on separate stationary pivot axes, and the stops normally remain in stationary positions on these pivot axes. These normally stationary tripping stops are successively tripped by start and stop tripping lugs projecting from start and stop time selecting dials which normally rotate continuously with the time driven apparatus of the device, such as the hour hand of the time clock. These start and stop time selecting dials can be given any desired preselected settings by the housewife to control the duration of the cooking operation and the stopping time of the cooking operation. One of the factors contributing to the greater accuracy of our improved construction is that the start and stop tripping lugs rotate on relatively large radii, and hence finer settings can be given to the angular positions of these tripping lugs. Another factor contributing to the greater accuracy is that the tripping mechanism which intervenes between the start and stop tripping lugs on the dials and the control arm on the switch actuating shaft is in the form of normally stationary tripping stops mounted on stationary pivot axes. This enables the tripping tolerances and clearances of the parts to be made more accurately for greater accuracy of timing.

Another feature of our invention resides in an improved construction and operating relation of the manually settable time selecting dials, which have been particularly designed to simplify the operations of setting the stop-cooking time and the cooking-hours time, and to minimize the possibility of the housewife making a mistake in setting up these preselected times on the device. In this improved construction the start dial and the stop dial are arranged concentrically of the clock dial and are of relatively large diameter so that the time markings thereon can be of relatively large size. Also, the duration of the cooking operation is indicated by two types of indicia; i.e. firstly, by numerical indicia in the form of a cooking hours scale of numerals on one of the dials, and secondly, by color indicia in the form of a brightly colored sector on one of the dials which is made of greater or lesser length in angular span corresponding to a greater or lesser length of cooking operation.

Another feature of the invention resides in an improved switch actuating arrangement which enables the housewife to manually rotate the switch actuating control shaft in one direction or the other at any time so as to place the control shaft in any one of four cyclical positions, as desired. This greatly facilitates the setting of the timer in condition for (1) fully automatic operation; (2) semi-automatic operation; and (3) manual operation. Fully automatic operation is represented by the establishment of two time settings which predetermine the time when the switch is automatically closed to start the cooking operation and which predetermine the time when the switch is automatically opened to stop the cooking operation. Semi-automatic operation is represented by the establishment of only one time setting, according to which the switch is immediately placed in closed circuit position to start the cooking operation, and the time setting automatically predetermines the time of opening of the switch to stop the cooking operation. Manual operation is represented by a closed circuit condition of the switch to place the cooking range under the control of a separate manually operated switch. The ability to rotate the switch actuating control shaft in either direction any time at will serves to simplify the operation of placing the timer in any one of the above three conditions; and it also enables the housewife to instantly correct any mistake she may have made in the positioning of this control shaft. This feature is made possible by an improved retractable construction of the control arm which projects from the switch control shaft in position to be intercepted by the successive tripping and control stops. The tip of this control arm has a normal effective radius which is intercepted by the successive tripping and control stops in the spring-biased direction of rotation of the shaft. However, by virtue of the improved retractable construction, the exertion of a manual torque through the shaft to the control arm in this same direction of rotation operates automatically to shorten the effective radius of the control arm for clearing the tripping and control stops.

Still further with regard to this switch control shaft, another object of the invention is to provide an improved construction characterized by a more advantageous sequence of steps through which the switch control shaft and its operating knob rotate in the control of the switch contacts. The control shaft and its knob are spring urged to rotate in one direction in the automatic cyclical operation of the timer, in which direction of rotation the shaft successively occupies four different positions. The conventional practice heretofore has been to have the following sequence of control in these four different positions:

(1) The so-called "Manual" position in which the switch is closed;

(2) The so-called "Automatic" or "Set" position in which the switch is open and the device is set in readiness for a fully automatic operation;

(3) The start-cooking position in which the switch is closed for starting the cooking operation;

(4) The stop-cooking position in which the switch is open for stopping the cooking operation.

In these prior devices employing the above-described sequence of steps, when the housewife desires to place the cooking range under manual control at the conclusion of a fully automatic operation or a semi-automatic operation she must turn the control shaft knob from position (4) back through positions (3) and (2) in opposition to the tension of the biasing spring in order to place the control shaft in the desired manual position, which is position (1). This reverse direction of rotation of the control shaft knob, against the tension of the biasing spring, is a complication which she is quite likely to forget, particularly between infrequent uses of the range timer.

In the improved construction embodied in our present range timer, the so-called "Manual" position has been transposed from position (1) to terminal position (4), the other positions being merely shifted up in sequence. Hence, at the conclusion of a fully automatic or semi-automatic operation of the timer, the control shaft occupies position (3), and when the housewife wishes to place the cooking range under manual control she merely turns the shaft from position (3) to terminal position (4). This is a more natural operation than the foregoing because it is only a single step movement and is in the same direction that the shaft has been rotating in the automatic cyclical operation, and also because it is not in opposition to the tension of the biasing spring. Still further, this latter sequence of steps adapts the timer to connection with other control apparatus in situations where it may be desirable to have the timer automatically tripped into "Manual" position by automatically operating means.

Another feature of the invention resides in an improved coaxial mounting and sequence of position of the hour hand dial, the stop-cooking dial, the cooking-hours dial and a masking dial coacting therewith, all of these dials being mounted on a continuously rotating time driven arbor rotating with the clock movement. Still another feature of this same assembly is an improved manner of transmitting a frictional drive from the time driven arbor to the hour hand dial, the stop-cooking dial and the cooking-hours dial through frictional washers disposed between the dials.

Referring now to the interval timer, this mechanism serves to indicate the expiration of any manually set time interval ranging from a few minutes up to approximately 55 minutes' duration or longer. The interval timer preferably gives an audible signal upon the expiration of the preset time interval; although it may perform a switch controlling operation in addition to or in lieu of the audible signalling operation, if desired.

One of the principal objects of the invention is to have the interval timer arranged concentrically of the clock dial and clock hands of the motor driven clock basic-assembly; furthermore, the pointer of the interval timer sweeps over an interval timer scale which is arranged concentrically of the clock dial. Also, the time driven movement of the interval timer pointer has the same clockwise direction of rotation as the clock hands. This makes the operation and setting of the interval timer more readily understandable to the housewife. Moreover, the resulting structure is of more compact over-all dimension than in prior constructions in which the interval timer is located eccentrically to or on one side of the clock dial. In our combination units wherein the motor driven clock basic-assembly has combined therewith our improved range timer mechanism and our improved interval timer mechanism, the resulting structure has the time selecting dials of the range timer and the time indicating pointer of the interval timer both concentric of each other and of the clock dial, which further simplifies the setting of both, and results in a more compact construction.

Another feature of our improved interval timer mechanism is a unique laterally deflectable mounting of the continuously rotating time driven pinion which, in the operation of the interval timer, is adapted to transmit timed rotation to a larger driven gear mounted on the interval timer shaft. This larger driven gear is of the sector or mutilated type having a toothless idling notch in its periphery in which the time driven pinion normally has idling rotation. In the setting of the interval timer, this larger driven gear is manually rotated to bring a greater or lesser portion of its toothed periphery into mesh with the continuously rotating driving pinion for time driven operation of the interval timer shaft. This manual meshing of the mutilated driven gear with the continuously rotating driving pinion may encounter difficulties because of end-to-end abutment of the teeth of one gear with the teeth of the other gear. In our improved construction, any such difficulties in effecting a manual meshing of the gears are avoided by so mounting one of the gears, preferably the driving pinion, that this gear can be deflected laterally momentarily if there is any tendency for end-to-end abutment of the teeth in the meshing operation.

Another object of the invention is to provide: (1) an improved motor driven clock basic-assembly; (2) an improved range timer mechanism or sub-assembly; and (3) an improved interval timer mechanism or sub-assembly, all constructed and arranged whereby either the range timer or the interval timer, or both, can be combined with the motor driven clock basic-assembly, as desired by the range manufacturer or like customer, with a minimum deviation from standard construction of parts, standard assembly, etc.

Another object of the invention is to provide timing mechanism of the above general description which is reliable in its operation, and which is inexpensive to construct and assemble.

Other features, objects and advantages of the invention will be apparent from the following detail description of three preferred embodiments of the invention. In the accompanying drawings illustrating such embodiments:

Figure 1 is a front elevational view of one of our combined range timer and interval timer units, wherein both the range timer sub-assembly and the interval timer sub-assembly are combined with the motor driven clock main-assembly;

Figure 2 is a rear elevational view of the same;

Figure 3 is an edge view of this combination unit corresponding to a view looking downwardly on the plane of the line 3—3 of Figure 1;

Figure 7 is a view partly in elevation and partly in section, taken approximately on the plane of the line 7—7 of Figure 5, and showing the action of the manually presettable rotating tripping pins on the normally stationary tripping stops of the range timer;

Figure 8 is a fragmentary sectional view of the switch control arm and biasing spring of the range timer, as indicated approximately by the section plane 8—8 of Figure 5, this view showing the movement of the control arm from the first to the second stop positions;

Figure 9 is a view similar to Figure 8 showing the movement of the switch control arm from the third to the fourth stop positions;

Figure 10 is a detail axial sectional view through the switch control arm and switch control cam of the range timer;

Figure 11 is a detail elevational view showing how the manually actuated retracting mechanism retracts the switch control arm for clearing the tripping stops, corresponding to a view taken on the plane of the line 11—11 of Fig. 10;

Figure 12 is a detail elevational view of the switch control arm alone;

Figure 13 is a detail sectional view showing how the control cam actuates the movable switch yoke;

Figure 14 is a detail sectional view taken approximately on the plane of the line 14—14 of Figure 15, showing a modified form of switch control cam operating a modified form of switch of high current capacity;

Figure 15 is a fragmentary side view of the latter;

Figure 16 is a detail sectional view of the interval timer mechanism including the vibratory spring arm and hammer, the control cam, and the shut-off lever;

Figure 17 is a detail sectional view of the motor pinion drive to the interval timer gear having an idling gap in its periphery;

Figure 18 is an axial sectional view through the motor driven pinion showing how it can be laterally deflected to accommodate meshing with the interval timer gear;

Figure 22:
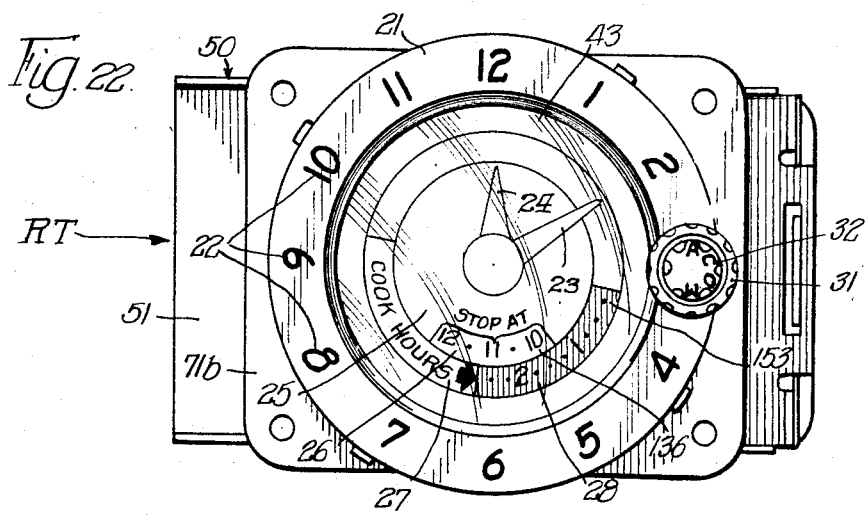
Figure 23:
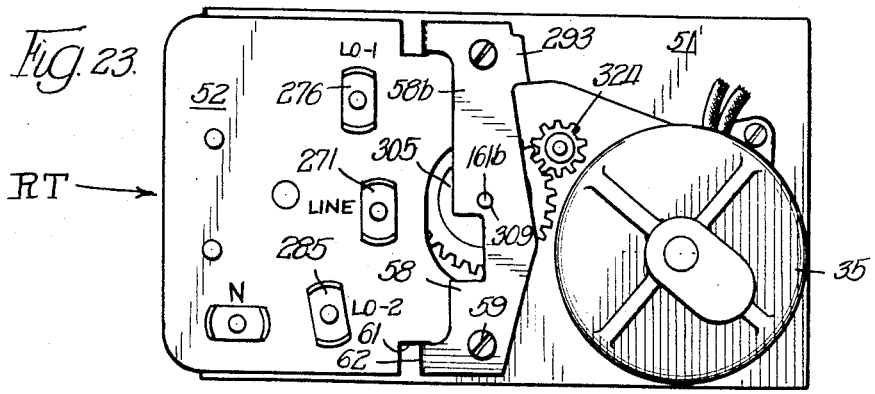
Figure 24:
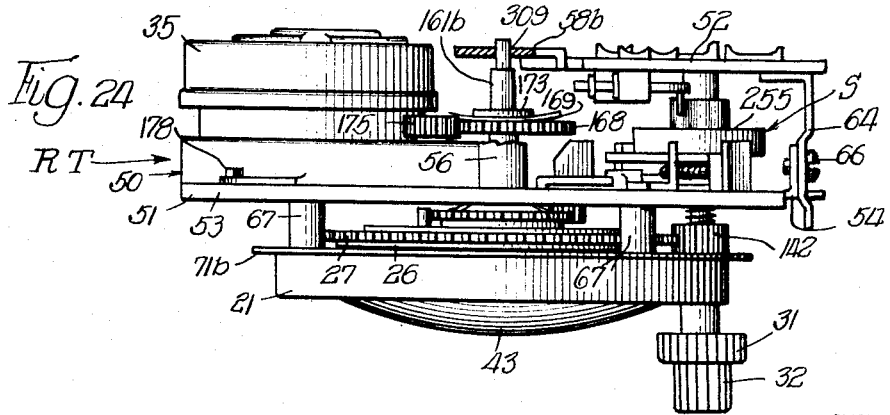

Figures 19, 20 and 21 are views similar to Figures 1, 2 and 3, but illustrating the motor driven clock basic-assembly as having only the interval timer mechanism combined therewith; and Figures 22, 23 and 24 are views similar to Figures 1, 2 and 3, but illustrating the motor driven clock basic-assembly as having only the range timer mechanism combined therewith.

In Figures 1 to 13 inclusive, we have shown one embodiment of combination range timer and interval timer, designated RTIT in its entirety, in which the range timer switch is particularly designed for the control of gas heated cooking ranges. In gas range installations, the electrical switch of the automatic range timer need only control a low amperage circuit serving to energize an electrically operated valve governing the flow of gas to the range. Hence, for gas range installations the timer switch need only be of light duty type, such as a 15 ampere switch. In the case of electrically heated cooking ranges, it is the general practice to have the entire heating current governed by the timer switch directly. For such installations, the timer switch should be of relatively high capacity, capable of handling 30 amperes or more without contact difficulties. In Figures 14 and 15 we have illustrated the timer provided with such higher capacity switch and a modified form of switch actuating cam mechanism, the remainder of the combination range timer and interval timer RTIT being otherwise the same.

It is believed that a thorough understanding of the invention will be simplified by first briefly pointing out or high-lighting the main elements which make up: (1) the motor driven clock basic-assembly; (2) the automatic range timer mechanism; and (3) the interval timer mechanism. Following such brief outlines of these three, we shall then describe all of the parts in detail.

Figure 5:
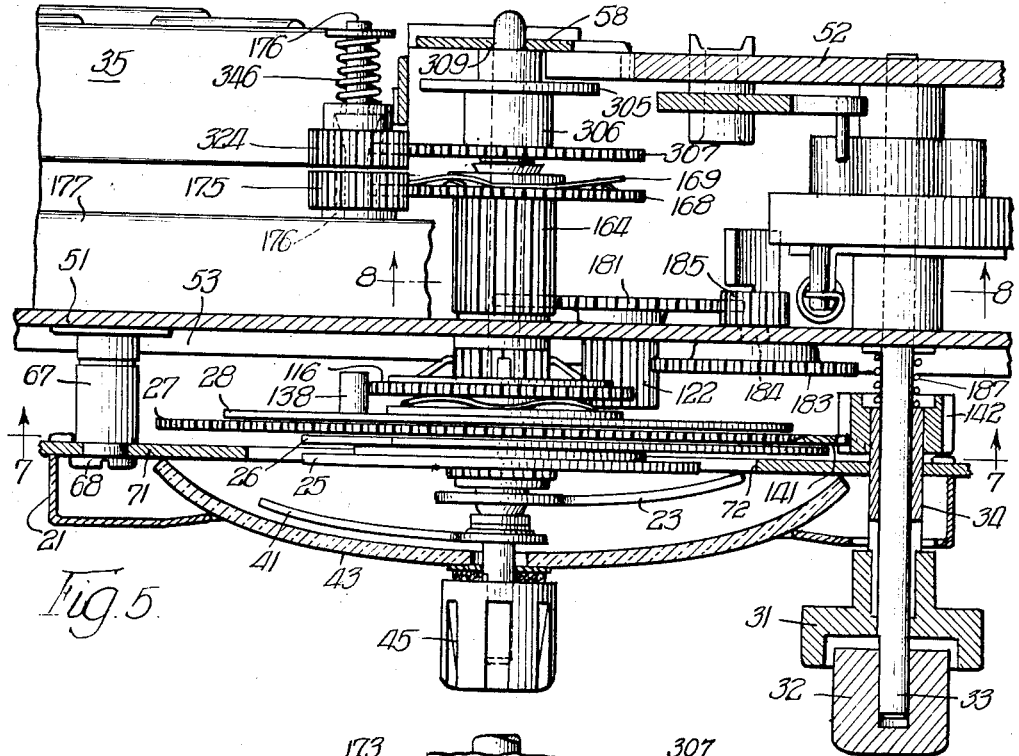
Figure 5 is a view on a larger scale, partly in elevation and partly in section, taken generally on a horizontal plane passing through the center of the clock and the center of the switch control shaft in this combination unit.

Referring now to the main parts which make up the motor driven clock basic-assembly, these comprise a clock dial 21 having the twelve conventional hour numerals 22 around its periphery. Rotating within this clock dial 21 are the hour hand 24 and the minute hand 23, the hour hand being imprinted on or otherwise carried by an hour hand dial 25, as will be later described. The various parts of the motor driven clock basic-assembly are mounted on a frame structure 50 comprising a main frame plate 51 disposed in an intermediate plane of the assembly, together with a rear bearing plate 58 (or 58b). These intermediate and rear plates 51 and 58 are supplemented in most instances by a front mounting plate 71, which is secured to the main frame plate 51 by three spacing posts 67, 67' and 67''. The alternating current synchronous motor 35 is mounted on the back side of this main frame plate 51. Staked substantially centrally in this main frame plate 51 and passing therethrough is a relatively long tubular bearing bushing or sleeve 81, which constitutes the main bearing support for practically all of the rotating parts that are concentric of the clock dial 21. For example, the minute hand shaft or sleeve 161 which supports and drives the minute hand 23 passes axially through the inside of this main tubular mounting hub 81, having internal bearing support therein. Conversely, the splined arbor 83 which mounts and drives the hour hand 24 (25), passes axially over the outside of this mounting hub 81, having external bearing support thereon. The minute and hour hands 23 and 24 of the clock basic-assembly are geared together in the proper ratio by a gear train comprising the gears 164, 181, 122 and 116 (Figure 5). The time controlled drive of the synchronous electric motor 35 is transmitted to the clock hands 23 and 24 through the motor pinion 175 which meshes with the large gear 168 mounted concentrically of the minute hand sleeve or arbor 161. The rotation of large gear 168 is transmitted to the gear-train gear 164 and to the minute hand arbor 161 through a friction slippage clutch comprising gear 168 and friction slippage disk 169, so as to permit manual setting of the clock hands 23 and 24 in either direction without having to drive back through any of the reduction gearing in the synchronous electric motor unit 35. The manual setting of the clock hands is adapted to be performed through a laterally disposed knob 31 (or 31a) connecting with a setting pinion 142 (or 142a) which is shiftable axially into mesh with the gear 183 (or which remains permanently in mesh therewith), whereby manual rotation of said knob can be made operative to set the clock hands through the train of reducing gearing connecting the clock hands. The clock hands are usually covered by a conventional cover glass 43. The foregoing elements and parts constitute the major portion of the motor driven clock basic-assembly.

Figure 4:
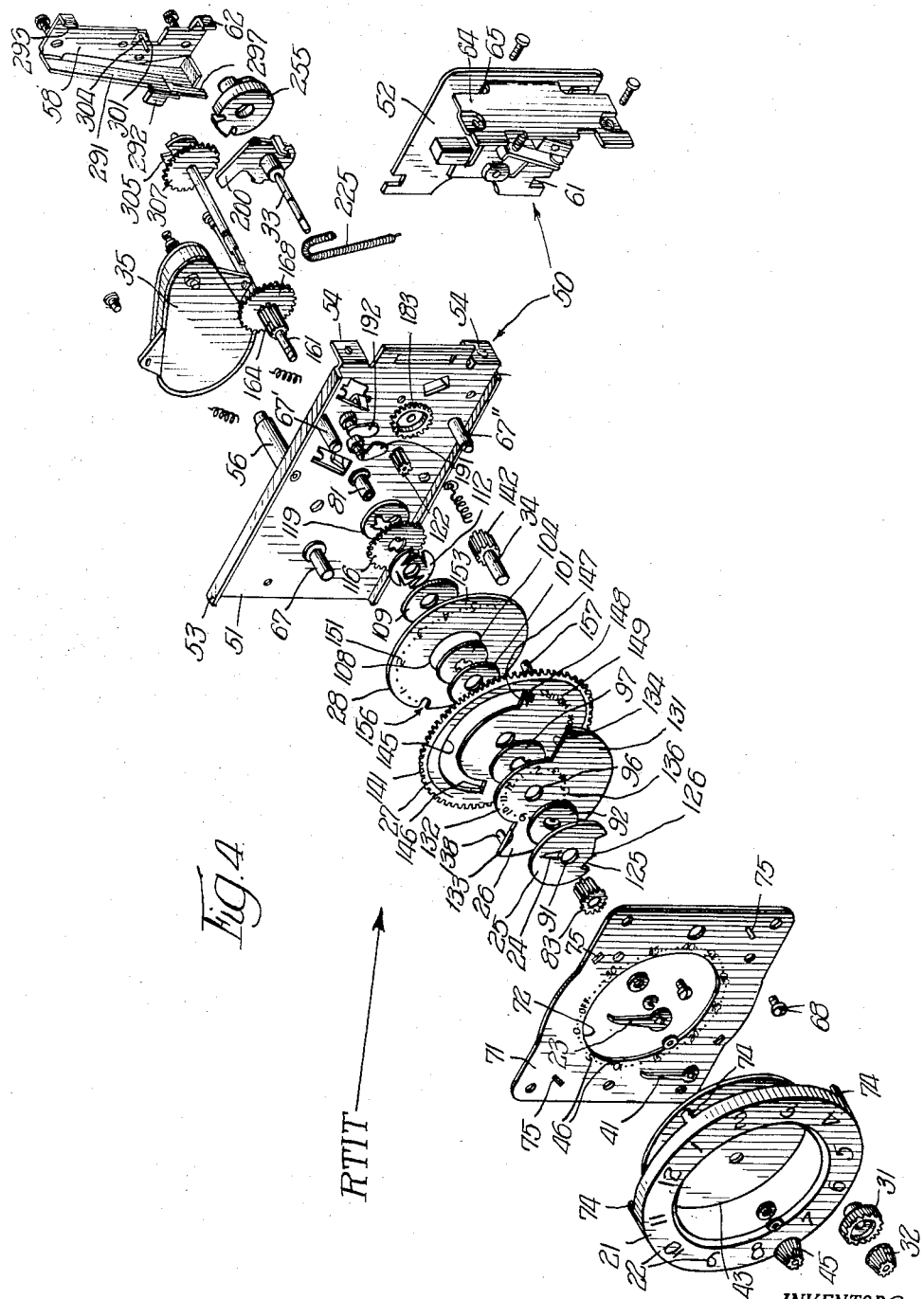
Figure 4 is an exploded perspective view of the different mechanisms entering into this combination unit.
Figure 6:
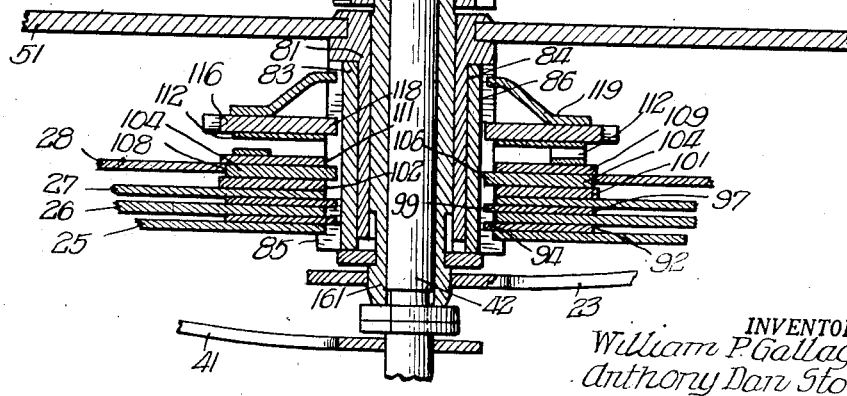
Figure 6 is a horizontal sectional view on a still larger scale, through the axis of the clock hands, time selecting dials of the range timer, interval timer shaft and pointer of the interval timer, etc.

Referring now briefly to the parts of the range timer mechanism which appear at the front of the unit, it will be seen from Figures 1, 4 and 6 that this range timer mechanism comprises a sequence of dials all disposed behind the front dial 25 (that carries the hour hand 24), and all mounted on the same splined arbor 83 that mounts this front hour hand dial 25. These include a manually settable stop (stop-cooking) dial 26, a manually settable start (cooking hours) dial 27, and a so-called masking dial 28 disposed behind the cooking hours dial 27. As will be later described in detail, the stop dial 26 carries a circularly arranged series of numerals which are presented in a sight window in the hour hand dial 25 for denoting the stop-cooking time; and the masking dial 28 carries a semi-circular ring of numerals and an associated color band which are presented in a sight window defined by or associated with the cooking-hours start dial 27 for denoting the number of cooking hours which have been manually preset on the timer. The manual presetting of the stop-cooking dial 26 and of the cooking-hours dial 27 is accomplished through the same knob 31 which is operable to set the clock hands, this knob 31 being located at the right side of the clock dial, and disposed forwardly thereof (Figure 3). A second knob 32 of smaller diameter than the knob 31 is disposed in front of the knob 31 for operation independently thereof, this front knob 32 being mounted on a switch actuating shaft 33 (Figure 5). This other knob 32 serves to manually operate the shaft 33 and also to indicate the position then occupied by the shaft. As shown in Figure 1, the front face of the small knob 32 is provided with the four angularly spaced letters A—C—O—M, representing: Automatic—Cooking—Off—Manual. That letter of the series which is uppermost on the knob, in registration with the stationary index mark 31' on the clock dial, indicates the position then occupied by the switch controlling shaft and its switch actuating cam apparatus; viz., since the letter A is uppermost in the position shown in Figure 1, the switch actuating cam is then in its "Automatic" (or "Set") position. As shown in Figure 5, the rear knob 31 is mounted on a sleeve 34 which surrounds the shaft 33 and has geared connection with the time selecting dials 26, 27, etc., as will be later described.

As will be later described in detail, the alternating current synchronous motor 35 which is operatively connected to transmit timed rotation to the minute hand 23 and to the hour hand 24 (and its dial 25), also normally transmits time controlled rotation to the time selecting dials 26, 27 and 28 through the splined arbor 83. The main control switch of the timer which responds to the preset times set up on the time selecting dials 26 and 27 is indicated in its entirety at S in Figure 3.

Referring now briefly to the parts of the interval timer mechanism which appear at the front of the unit, these comprise a separate pointer 41 mounted on an interval timer shaft 42 (Figure 6) which extends axially through the assembly of clock hands and manually presettable selecting dials. The front end of this interval timer shaft 42 extends out through a central aperture in the cover glass 43 which covers the time indicating hands and dials, the outer end of this interval timer shaft being provided with a setting knob 45 by which the interval timer may be set. The interval timer pointer 41 cooperates with an interval timer scale 46 of relatively large radius which surrounds the manually presettable time selecting dials. This interval timer scale has an "Off" position, and a short gap 48 followed by a series of numerals and minute indicating dots ranging from zero substantially to 55, or more, the latter corresponding to the Off position. The progression of these time scale numerals is in a counter-clockwise direction, but in the use of the interval timer the pointer 41 will be preset by rotation of the knob 45 in either direction to a particular point of the scale corresponding to the length of time interval to be measured, following which the pointer will thereafter rotate in a clockwise direction in returning back to its Off position. The arrangement of the interval timer shaft, knob pointer and scale concentrically of the clock dial and clock hands has the aforementioned advantages of a more simplified operation and a more compact construction; and in addition is advantageous in situations where the interval timer is omitted and the unit has only a range timer, because such omission of the interval timer does not introduce the problem of concealing a hole, interval timer scale, index marker or other front cover details usually associated with an interval timer.

Referring now more particularly to the details of construction of our combination range timer and interval timer RTIT, all of the previously described elements have mounting on the aforementioned frame plates 51, 58 and 71 and also on a rearwardly disposed insulating panel 52 (Figures 3, 5, etc.). The main or intermediate frame plate 51 is in the form of a rectangular flat stamping having forwardly projecting stiffening flanges 53 along its top and bottom edges, and also having rearwardly projecting mounting lugs 54 at its right hand end, for a purpose to be later described. Staked to the upper and lower portions of the frame plate 51 substantially midway between its ends are rearwardly projecting spacing posts 56 which support the left hand edge of the insulating panel 52. The rear ends of these spacing posts 56 are reduced to form annular shoulders 57 against which the adjacent edge of the insulating panel 52 bears. This edge of the insulating panel 52 is locked against the annular shoulders 57 by the metallic bearing plate 58 which is secured to the outer ends of the spacing posts in the position overlying the back side of the insulating panel, such bearing plate 58 being secured by screws 59 which thread into tapped bores in the outer ends of the spacing posts. As best shown in Figures 2 and 3, the insulating panel 52 has notches 61 blanked out of its top and bottom edges, and the metallic bearing plate 58 is provided with forwardly bent lugs 62 which hook into the notches 61 in the insulating panel and thus hold the lateral panel against sidewise displacement off the bearing shoulders 57. In the particular embodiment disclosed employing the low capacity switch, the right hand end of the insulating panel is supported by a metallic end plate 64 which has an inwardly turned flange 65 at its outer edge suitably riveted to the insulating panel, the forward portion of this end plate 64 being secured to the rearwardly bent lugs 54 of frame plate 51 by screws 66.

Referring particularly to Figures 3–5, it will be seen that the front side of the main frame plate 51 is provided with the forwardly projecting spacing posts 67, 67' and 67", the front ends of which are internally threaded for receiving mounting screws. Mounted on the front ends of these spacing posts by screws 68 is the front mounting plate 71. This plate 71 has a large central opening 72 therein for exposing the clock hands and time selecting dials, and inscribed around the margin of this central opening 72 is the interval timer scale 46. Disposed in front of the plate 71 is the annular clock dial 21, preferably in the form of a circular escutcheon ring. Projecting rearwardly from this escutcheon ring are lugs 74 (Figure 4) which are adapted to pass through slotted apertures 75 in the plate 71, these lugs then being bent over on the back side of the plate 71 to secure the clock dial escutcheon ring to the plate. The cover glass 43 is held in place between the escutcheon ring 21 and plate 71. In some instances, the manufacturer of the cooking ranges will prefer to supply his own clock dial 21, which may be in the form of a ring of numerals inscribed on a mounting panel constituting part of the stove structure. In such cases, the timer is supplied to the range manufacturer without the clock dial escutcheon ring 21, the cover glass 43 then being held in place by washers under the heads of the screws 68, or being separately supplied by the range manufacturer. In other instances, the range manufacturer may prefer to dispense with the plate 71, in addition to the clock dial escutcheon ring 21, and mark the interval timer scale 46 and the clock dial numerals 22 directly upon a mounting panel, instrument panel or the like, constituting part of the range structure. In such cases, the main frame structure of the range timer and interval timer assembly can be secured to the back side of such mounting panel by screws passing therethrough and threading into the three front mounting posts 67, 67' and 67''. The elimination of the clock dial ring 21, or of the front mounting plate 71, or both, from the finished assembly as supplied to the range manufacturer does not affect the operability of the unit as supplied to him, nor require assembly operations on his part, because the clock hands, time selecting dials and interval timer shaft all have their entire bearing support on the main frame structure 50, independently of ring 21 or plate 71.

Referring now to the bearing mounting of the clock hands, time selecting dials, etc. on the main frame structure 50, it will be seen from Figures 4 and 6 that the main bearing bushing or sleeve 81 is staked in the center of the frame plate 51 and projects forwardly therefrom. Rotatably journaled on the outer surface of this stationary main bearing 81 is the tubular splined hub or arbor 83 which rotates with a continuous rotation, time driven at a rate of one revolution each 12 hours, and which mounts and frictionally drives the hour hand dial 25, the stop dial 26 and the cooking hours dial 27. Referring particularly to Figure 6, it will be seen that this splined arbor 83 comprises a shank portion 84 and an enlarged head or end portion 85. Toothed splines 86 run the entire length of the tubular arbor, these splines being evenly spaced around the arbor substantially in the form of gear teeth; through which the time driven drive is transmitted to the arbor, and also through which the above friction drive is transmitted from the arbor to the dials 25, 26 and 27 by way of friction disks having keyed engagement with the splines. As shown in Figure 4, the hour hand dial 25 has a central circular opening 91 therein which can slip freely over the splines 86 of the arbor shank portion 84, this hour hand dial being held resiliently pressed forwardly against the enlarged head portion 85 of the arbor. The time driven rotation of the arbor is transmitted to this hour hand dial, at the rate of one revolution each 12 hours, by a friction driven washer 92 which is mounted on the arbor directly in back of the hour hand dial and which is maintained resiliently pressed in frictional engagement with the back side of the hour hand dial. This friction drive washer 92 has a toothed central opening comprising one or more inwardly extending teeth 94 which engage in the spaces between the splines 86 for positively driving the friction washer 92 with the arbor, while permitting axial sliding movement of the friction washer along the arbor. The stop dial 26, located directly behind the washer 92, also has a central opening 96 of circular contour which can slip freely over the splines 86 so that this stop dial can be rotated relatively to the arbor and can slide axially thereof. The back surface of the driving washer 92 transmits frictional driving torque to the front surface of the stop dial 26. Directly behind the stop dial 26, is a second frictional washer 97 which is substantially identical with the frictional washer 92, i.e. it has a toothed central opening comprising one or more inwardly extending teeth 99 which engage with the splines so as to compel the washer 97 to rotate with the arbor while permitting sliding motion of the washer along the arbor. The front surface of this second frictional washer 97 exerts frictional driving torque against the back surface of the stop dial 26. The cooking hours or start dial 27 is located directly behind the second frictional washer 97 and is maintained in resilient engagement therewith so that the back side of the second frictional washer 97 transmits driving torque to the front surface of the start dial 27. Located on the back side of the cooking hours start dial 27 is a spacing washer 101 having a continuously circular central aperture 102 therein which does not compel the washer to rotate with the splined arbor. Directly in rear of the latter spacing washer 101 is a drive washer 104 having a toothed central opening provided with driving teeth 106 adapted to mesh with the spaces between the splines of the arbor. As shown in section in Figure 6, this drive washer 104 is substantially thicker than the first and second frictional drive washers 92 and 97. The masking dial 28 has a relatively large central opening 108 therein which has bearing mounting directly upon the outer periphery of the relatively thick drive washer 104. Directly behind the masking dial 28 is another spacing washer 109 having a continuously circular central opening 111 therein, this washer being substantially a duplicate of the spacing washer 101. Bearing against the back side of the washer 109 is a spider spring type of washer 112 which can rotate freely on the splined arbor. This spider spring washer 112 bears at the front side against the back of the washer 109, and bears at its back side against the front surface of the driving gear 116 provided with a toothed central opening 118, whereby this driving gear positively drives the time driven arbor 83, but is free to slide axially thereof. It will be understood that the spider spring washer 112 can be of any suitable type comprising a plurality of axially deflected spring spider arms which tend to exert a constant thrusting force forwardly through the assembly to maintain the frictional driving surfaces at a substantially constant predetermined frictional driving pressure. The back side of the driving gear 116 is adapted to have thrust abutment against a suitable abutment surface to afford a point of thrust reaction for the spider spring washer 112. Preferably, this thrust abutment member 119 is in the form of a push type of lock washer which is adapted to be pushed forwardly over the rear end of the splined arbor and which will take a wedge-locked position at the innermost point to which it is pushed along the arbor, such device being typically represented by a "Tinnerman Speed Nut." In the completely assembled relation, the spider spring washer 112 maintains a frictional drive from the splined arbor to the hour hand dial 25, the stop dial 26 and the start dial 27. The masking dial 28 is of thinner section than its mounting washer 104, and no frictional driving force is exerted against this masking dial, the latter being rotated concurrently with the stop dial 26 through a pin connection which will be later described. The peripheral teeth of the driving gear 116 mesh with a pinion 122 extending forwardly from the front side of the main frame plate 51, this pinion having connection on the back side of the frame plate through a train of speed reduction gearing with the alternating current synchronous motor 35, as will be later described, whereby the splined arbor 83 and the sub-assembly mounted thereon has a continuous time driven rotation of one revolution every twelve hours. Attention is directed to the fact that the above described construction and arrangement of the dials 25, 26, 27, etc. and the cooperating friction drive washers on this splined tubular hub 83 results in a sub-assembly which can be quickly and easily assembled as a finished unit before it is included in the general assembly of the timer, such sub-assembly being merely slipped over the main bearing sleeve 81 with the drive gear 116 placed in mesh with the pinion 122.

Referring now more particularly to the automatic time tripping functions performed by the stop dial 26 and by the cooking hours dial 27, and the manner in which these tripping times are preset, it should first be noted that the hour hand dial 25 rotates continuously with the time driven splined arbor 83 at all times, and can only be manually shifted in the operation of adjusting the hour and minute hands of the clock through the manual or time setting adjustment which will be later described. Punched out in the edge or near the edge of the hour hand disk 25, preferably at a point substantially diametrically opposite to the hour hand pointer 24, is an arcuate slot or sight window 125 provided with a central pointer 126. This pointer 126 establishes an index point relatively to which the stop cooking time is adapted to be manually preset. For designating this index characteristic of the pointer 126, there is marked down on the hour hand dial 25 suitable indicia 127 such as—"Stop at"—such indicia indicating that the cooking operation being performed or to be performed by the cooking range will stop at the particular hour which has been manually preset in registration with the index point 126.

These stop cooking hours are marked on the front face of the stop cooking dial 26 which is mounted behind the hour hand dial. This stop cooking dial 26 comprises a semi-circular sector 131 of relatively large radius and a semi-circular sector 132 of relatively small radius, these two sector portions being joined by the radially extending shoulders or edges 133 and 134 forming the ends of the large sector portion 131. The stop cooking numerals, designated 136, are arranged in a circular time indicating numerical scale of slightly smaller radius than the sector 132, there being twelve of these numerals to designate the twelve hours of the clock dial, together with intervening dots or lines designating fractional hour intervals. These hour and fractional hour markings appear in the sight window 125, the particular numeral or fractional hour marking which is in registration with the index point 126 in this window designating the time at which the cooking operation is to stop. As will be later described, in the manual presetting operation, this stop cooking dial 26 can be rotated manually relatively to the hour dial 25 for bringing any desired numeral or fractional hour point in registration with the indexing point 126 for predetermining when the cooking operation is to cease, the stop cooking dial 26 thereafter rotating continuously with the hour hand dial 25 so that the stop cooking indication is continuously maintained in this rotating sight window 125, once this preset time has been established. Such manual presetting of the stop cooking dial 26 predetermines the angular position of a stop cooking tripping pin 138 projecting rearwardly from the dial 26 substantially at the radial shoulder 133, i.e. the angular presetting of the stop dial 26 predetermines the position which the tripping pin 138 will have relatively to the hour hand pointer 24 at the time that the tripping pin 138 actuates the stop cooking tripping lever to open the timer switch and stop the cooking operation.

Referring now to the start or cooking-hours dial 27, this dial is slightly larger than the stop dial 26 and has a continuous circular periphery provided with gear teeth 141. Continuously meshing therewith is a pinion 142 secured to the sleeve 34 on which is mounted the setting knob 31, the start selection time and the cooking-hours selection time both being preset through this setting knob 31 and its geared connection through pinion 142 with the gear teeth on the start dial 27. Punched out of this start dial 27 is an arcuate slot 145 having its opposite ends 146 and 147 spaced apart slightly more than 180°. The radius of this slot 145 is such as to permit the stop tripping pin 138 on the stop dial 26 to pass through this slot 145 and to project rearwardly beyond the rear face of the dial 27 a substantial distance. Inscribed on the face of the dial 27 at the end 147 of the arcuate slot is an arrow 148 pointing to this shoulder end 147 of the slot; and also inscribed on the face of the dial 27 and extending in curved prolongation of the arrow is the indicia 149 entitled "Cook Hours." The arcuate slot shoulder 147 identified by the pointer 148 and indicia 149 constitutes an index point against which are read a series of numerals 151 appearing in the arcuate slot 145. These cooking hour numerals 151 extend as an arcuate time indicating numerical scale over approximately 180° of the front face of the masking dial 28, the successive numerals having three dots or lines therebetween dividing each hourly interval into 15 minute periods. These cooking hour numerals 151 and intermediate dots are printed on a distinctively colored arcuate band 153 on the front face of the masking disk 28. This colored arcuate band is preferably of a color which will stand out in sharp contrast to the colors of the front faces of the hour hand dial 25, stop dial 26 and start dial 27. As for example, a rather brilliant red color for contrast with grey, blue, white or gold colors on the dials 25, 26 and 27. The masking dial 28 is rotatably locked to the stop dial 26 by providing the masking dial with a notch 156 in its periphery adapted to receive the stop tripping pin 138 which projects from the stop dial through the arcuate slot 145 and through the notch 156, the rear end of this stop pin projecting substantially beyond the back side of the masking dial 28 in position to engage the stop tripping lever of the normally stationary tripping stops. The peripheral notch 156 in the masking dial 28 is located substantially at the beginning or zero point in the scale of cooking hour numerals 151.

Projecting rearwardly from the back side of the start cooking dial 27 is a start tripping pin 157 which is adapted to engage the start tripping lever of the normally stationary tripping stops. Such pin 157 is angularly situated in relatively close proximity to the index end 147 of the arcuate sight window 145, and this pin is located outwardly at a radius which will enable the pin to project rearwardly beyond the periphery of the masking dial 28 into a tripping position lying to the rear of said dial. It will be seen from the description thus far that all manual presetting operations are transmitted through the pinion 142 to the tooth periphery 141 of the start or cooking-hours dial 27, and hence this dial functions as the master driving dial in the operation of manually establishing the selected times. The stop cooking time is set up first by rotating the start dial 27 in a clockwise direction sufficiently far to have the end shoulder 146 of the sight window 145 pick up the stop tripping pin 138 and carry it is a clockwise direction to present the desired numeral 136 at the index point 126; or by rotating the start dial 27 in a counterclockwise direction sufficiently far to have the stop shoulder 147 at the other end of the arcuate window pick up the stop tripping pin 138 and rotate the stop disk 26 in a counterclockwise direction sufficiently far to present the desired stop cooking numeral 136 at the index point 126. After the stop cooking time has been established in this manner, the cooking-hours time is then preset by rotating the dial 27 appropriately in one direction or the other, independently of movement of the dial 26, so as to present the index end 147 of the sight window in registration with the desired cooking hours numeral 151. The two steps of the manual presetting operation are now complete, and the dials 26 and 27 and their respective tripping pins 138 and 157 revolve continuously with the twelve hour rotation of the splined arbor 83 under the friction clutching action of the friction clutching disks 92, 97 and 104. Before proceeding to the description of the normally stationary tripping stop levers which are engaged by these tripping pins 138 and 157, we shall describe the minute hand drive assembly which extends axially through the splined arbor 83, and shall also describe the synchronous motor drive to the clock hands and the manner of adjusting or setting the clock hands.

Referring now to the mounting and the drive of the minute hand 23, this minute hand is staked or otherwise rigidly secured to the front end of the minute hand shaft 161 which extends axially through the splined arbor 83 and its dials 25, 26, 27 and 28, and passes axially through the stationary main bearing sleeve 81 projecting forwardly from the frame plate 51. Referring to Figure 6, it will be seen that on the back side of this frame plate the minute hand shaft 161 has a press fit within the bore of a relatively long spur pinion 164. When the automatic range timer of our invention is constructed to embody the aforementioned interval timer apparatus, the minute hand shaft 161 is constructed of tubular form to permit the interval timer shaft to pass axially through the minute hand shaft 161 and pinion 164; when no interval timer apparatus is embodied in the automatic range timer the minute hand shaft 161 can be of solid construction. The rear end of the pinion 164 is formed with successively reduced shoulders 166 and 167 on which are mounted respectively a relatively large spur gear 168 and a spring disk 169 establishing a friction slippage clutch. The large gear 168 is capable of friction slippage rotation relatively to the pinion 164, and this large gear is formed with angularly spaced punched protuberances 171 projecting rearwardly from its back surface. The friction slippage clutch disk 169 is secured fast in its mounting on the shoulder 167, and the contact of the front face of this disk with the protuberances 171 establishes a flexed condition of the disk at each of the angularly spaced points of the protuberances, whereby a very efficient, long wearing friction slippage clutch is established between the large gear wheel 168 and the remainder of the assembly; i.e. while the large gear 168 remains locked against any manual rotation because of its gear reduction drive to the synchronous motor, the pinion 164 and minute hand shaft 161 can be angularly adjusted relatively thereto in setting the clock hands. The spring disk 169 is held in place by a ring or washer 173 which is secured to a reduced rear end of the pinion 164 by a multiple staking or flaring operation. As will be seen in Figure 5, the large gear 168 meshes with a continuously rotating pinion 175 mounted on the drive shaft 176 projecting from the gear housing 177 of the electric motor unit 35. Embodied within the gear housing 177 is a train of speed reduction gearing extending from the shaft of the synchronous motor rotor to the outwardly projecting shaft 176. Thus, as long as the electric motor operates, it transmits a continuous time controlled rotation to the large gear 168. The electric motor is fastened to the back of the frame plate 51 by screws 178 passing through mounting lugs 179 on the motor and threading into the base plate.

Referring now to the drive for rotating the hour hand dial 25, it will be recalled that the relatively large gear 116 mounted on the splined arbor sub-assembly has continuous mesh with the pinion 122 projecting forwardly from the front side of the frame plate 51. This pinion is formed with a reduced pivot shank extending through the frame plate 51 and to the end of which is secured a relatively large spur gear 181 located in rear of the frame plate (Figure 5). Such large gear 181 meshes with the forward portion of the minute hand drive pinion 164 so that the hour hand and minute hand are positively geared together at the proper ratio through the gears 164, 181, 122 and 116.

Referring now to the operation of manually setting the clock hands 23 and 24; as for example when the cooking range or timer is first installed, or when the clock hands must be reset because of an accidental current interruption of appreciable duration, this setting operation is preferably performed by the same knob 31 which manually presets the time selecting dials 26 and 27. This dual purpose knob 31, together with its sleeve 34 and pinion 142, are freely rotatable on the switch control shaft 33 for transmitting rotative adjustment through said pinion 142 to the time selecting dial 27, etc.; and by mounting the knob and sleeve for inward shifting movement along the shaft 33 the pinion 142 can be shifted out of mesh with the dial gear teeth 141 and into mesh with another gear 183 which is pivoted on the front face of frame plate 51. The latter gear 183 has a reduced pivot shank 184 extending through the frame plate 51 and carrying a pinion 185 at its rear end on the back side of the frame plate. The pinion 185 is in continuous idling mesh with the gear 181 of the gear train connecting the hour and minute hands of the clock. Hence, by thus shifting the pinion 142 into mesh with the gear 183 of the idling pair 183–185, the knob 31 is operatively connected with the clock hand gear train for enabling the clock hands to be adjusted by rotative movement of this dual purpose knob 31. In such operation of adjusting the clock hands, the friction slippage clutch disk 169 permits the gears 116, 122, 164 and 181 to be rotated relatively freely in either direction, independently of the relatively slow unidirectional rotation which is being positively transmitted to the gear 168 by the electric motor 35. The dual purpose knob 31 is normally urged into its forward position, with the pinion meshing with the start dial gear teeth 141, by the action of a compression spring 187 surrounding the switch actuating shaft 33 and confined between the gear 142 and the frame plate 51.

Referring now to the tripping operations which are performed by the tripping pins 138 and 157 in their continuous time driven rotation, attention is directed to Figure 7 showing how the stop dial 26 carries the stop tripping pin 138 through an inner circular path or orbit designated X, and showing how the start dial 27 carries the start tripping pin 157 through an outer circular path or orbit designated Y. It will be noted that these concentric circular paths X and Y are of a relatively large radius, approximating the diameter of the entire clock dial, which enables finer settings to be given to the angular positions of the tripping pins 138 and 157. The orbit X of the stop tripping pin 138 intersects the normal position of spring biased stop tripping lever 191, and the outer orbit Y of the start tripping pin 157 intersects the normal position of the spring biased start tripping lever 192. These two tripping levers 191 and 192 are staked to pivot pins 193 and 194 passing through bearing bushings 195 and 196 which are anchored in the frame plate 51. On the back side of the frame plate, the pivot pin 193 carries a tripping stop 197, and the other pivot pin 194 carries a tripping stop 198. These two tripping stops or levers 197 and 198 are so located as to be at angularly spaced intercepting points in the path of rotary movement of a control arm 200 which projects from the switch control shaft 33 and rotates therewith. As will be seen from Figures 8 and 9, this switch control shaft 33 is spring biased so that it tends constantly to rotate in a counterclockwise direction, as viewed in Figures 7, 8 and 9 and whenever the control arm 200 is released from a tripping stop the arm and shaft tend to rotate in such spring biased direction. The trip lever 197 is formed with a rearwardly projecting shoulder or lug 197s adapted to be engaged by the control arm 200, and the tripping lever 198 is likewise formed with a stop shoulder or lug 198s adapted to be engaged by the control arm. These two tripping levers 197 and 198 are normally held in these intercepting or blocking positions by action of a compression spring 203 tending to bias the lever 197 in a counterclockwise direction, and by a compression spring 204 tending to bias the lever 198 in a clockwise direction. The spring 203 is set in a slotted opening 207 in the frame plate 51, with one end of the spring engaging over a lug 208 at one end of the opening, and with the other end of the spring engaging over a similar lug extending from a forwardly bent arm 211 formed as a part of the lever 197. The action of the compression spring holds the arm 211 pressed against the end surface 212 of the opening 207. In this normally stationary, spring biased position of the tripping stop assembly 191, 197, the cam-shaped lever 191 occupies a position in the circular path of movement X of the tripping pin 138, and the associated stop lever 197 occupies a stop position in the path of movement of the switch shaft control arm 200. The compression spring 204 acting on the other stop lever 198 is likewise recessed in a slotted opening 214 in the frame plate 51, with one end of the spring confined over a centering lug 215 and with the other end of the spring engaging over a similar lug extending from a forwardly bent arm 217 formed integrally with the stop lever 198. The compression spring normally holds the bent arm 217 against the end surface 219 of the slotted opening 214. Thus, in this spring biased, normally stationary position of the latter tripping stop assembly 192, 198, the cam lever 192 occupies a position in the circular path of movement Y of the tripping pin 157, and the stop lever 198 occupies an intercepting or stop position in the path of rotary movement of the switch shaft control arm 200.

The inner cam lever 191 has a sloping front cam surface 191′ formed along its leading edge, which is adapted to be engaged by the stop tripping pin 138 in the normal clockwise direction of rotation of this tripping pin; and similarly, the outer cam lever 192 has a similar sloping front cam surface 192′ along its leading edge adapted to be engaged by the start tripping pin 157 in the normal clockwise direction of rotation of this pin. The trailing end of the cam lever 191 has a sloping nose or cam surface 191″, and the trailing end of the other cam lever 192 has a similar sloping nose or cam surface 192″. The purpose of these trailing end cam surfaces on both levers is to insure that any reverse or counterclockwise rotation of the tripping pins 138 and 157, such as may occur momentarily in the manual presetting of the time selection dials, will not cause jamming against the cam levers, but will merely cause these levers to be swung away from their normal positions to a sufficient degree to clear the tripping pins. Attention is directed to the fact that it is possible to preset the timer for a very short cooking interval, if that should be desired. For example, by proper angular adjustment of the dials 26 and 27, the stop tripping pin 138 can be located at the very end of the arcuate slot 145, against the end shoulder 147. This places the two tripping pins 138 and 157 in such closely timed relationship that the two cam levers 191 and 192 are tripped almost simultaneously so that substantially no cooking operation occurs. By now separating the stop pin 138 slightly from the end wall 147 of the arcuate slot, the cam lever 192 can be tripped just slightly ahead of the cam lever 191 for effecting a relatively short cooking operation. In this regard, it will be seen that the points of location of the pivot axes 193 and 194 on the main frame plate can be proportioned or designed for different angular relationships of the start and stop tripping pins 157 and 138 or their time selecting dials or both. Only a very small amount of force or energy is necessary to swing either tripping stop 191, 197 or 192, 198 into its tripping position for releasing arm 200, and hence the friction slippage torque to be transmitted from the friction disks 92, 97 and 101 to the time selecting dials 26 and 27 need only be relatively light. Hence, the manual presetting of the time selecting dials is not rendered difficult by having to overcome a heavy frictional drag.

Figures 8 and 9 illustrate the biasing spring which exerts a constant biasing torque on the switch control shaft 33 tending to rotate it in the counterclockwise direction; such spring preferably being in the form of a helically coiled tension spring 225 having one end 226 hooked to the shaft assembly and having its other end 227 hooked to a relatively stationary point. The spring is arranged to wrap around a hub 228 which is secured to the control shaft 33 and which mounts the control arm 200, as will be later described. The biasing spring tends to rotate this control arm 200 from the first to the fourth positions designated by the four letters on the front end of the control knob 32: A (automatic); C (cooking); O (off) and M (manual). When the nose 200′ of the control lever 200 is latched against the stop shoulder 198s of tripping stop 198, the arm 200 is in the A (automatic) or set position, at which time the control switch is in its open circuit position. The control arm cannot be manually rotated in a clockwise direction beyond this "A" position because the back of the arm then strikes a stop lug 231 which is punched rearwardly from one margin of the opening 214 in frame plate 51. When the start cooking pin 157 oscillates the tripping stop 192, 198 in a counterclockwise direction, the nose 200′ of the arm 200 slips off the tripping lug 198s with the result that the arm snaps downwardly under its spring bias into engagement with the stop surface or lug 197s of tripping lever 197. This corresponds to the "C" (cooking) step in the cycle, at which time the contacts of the timer control switch are closed for starting the cooking operation. When the stop cooking pin 138 imparts clockwise oscillation to the tripping stop assembly 191, 197 the tripping surface 197s is swung out of the path of movement of the arm 200, thereby allowing this arm to be snapped down into its third position in engagement with a stop shoulder 232s (Figure 8). This third position is the "O" (off) position, at which time the contacts of the timer control switch are opened for stopping the cooking operation. This third position stop shoulder 232s consists of a lug bent rearwardly from a latching plate 233 which is pivotally mounted on a pivot pin 234 staked in the frame plate 51. This pivoted latch plate 233 is held in the normal position illustrated in Figure 8 by the helical biasing spring 225 which has its lower end 227 hooked to a lug 235 projecting rearwardly from the left hand edge of the pivoted latch plate. The right hand edge of this latch plate is provided with a stop lug 236 which is normally held spring pressed against an end limit stop lug 237 punched rearwardly from the frame plate 51. In this normal position in which the latch plate 233 is held by the biasing spring 225, the stop surface 232s of the plate intercepts the normal arc of movement Z of the control arm for defining the third position of said control arm, viz the "O" (off position) with the switch contacts open for stopping the cooking operation. When it is desired to manually move the switch control arm 200 from this third position into the fourth or manual position "M," the arm 200 is radially retracted (by mechanism to be presently described) which allows the nose 200′ of the control arm to clear the third stop surface 232s, whereupon the control arm is immediately spring biased in a counterclockwise direction into said fourth position, in which position the front edge of the arm 200 strikes the end limit stop lug 237. In this fourth or manual position, the control switch contacts are closed for placing the heating operation of the range under the control of a separate manually operated switch. This fourth position (M), with the switch contacts manually closed, represents the normal or terminal position of the switch control arm 200, back toward which normal position the tension spring 225 tends constantly to return the switch control arm 200 from any of its three other positions "A," "C" and "O." When the housewife desires to reset the timer either for fully automatic operation or for semiautomatic operation the manually rotates the control knob 32 in a clockwise or reverse direction for swinging the control arm 200 back up to either its first or second positions. In such reverse rotation of the control arm the third, second and first stops 232s, 197s and 198s are merely deflected out of the path of the control arm to permit the latter to clear these stops.

Referring now to the mechanism which serves to radially retract the control arm 200 to a smaller radius for clearing any of the stop surfaces 198s, 197s or 232s when it is desired to manually rotate the control arm in a counterclockwise direction, such mechanism has mounting on the aforementioned hub or bushing 228 which has a rigid drive fit over a knurled portion at the inner end of the switch set shaft 33 (Figure 10). At its rear end this hub or bushing 228 is formed with a first reduced neck portion 241 and a second reduced neck portion 242. Extending longitudinally of the hub from end-to-end is a relatively deep slot or notch 243 (Figure 11). As clearly shown in Figures 11 and 12, the control arm 200 is formed with a relatively large hub portion 244 which is mounted for substantially radial reciprocation on the first reduced neck portion 241 of mounting hub 228. The hub portion 244 of the control arm is provided with a slightly elongated opening 245 fitting over the first reduced neck portion 241, this opening being elongated substantially in the direction of the control arm 200 so as to permit the aforesaid retractive movement or throw of the control arm relatively to the axis of the mounting hub 228. As clearly shown in Figure 12, the elongated opening 245 is formed on one side with an inwardly projecting lug 246 of arcuate shape, this lug being adapted to fit into the motion transmitting slot 243 of the hub 228. As previously described, the upper end of the tension spring 225 is wrapped around the rotatable mounting hub 228 in the form of a partial loop 225', and the far end of this wrap-around loop 225' has a hook 226 which has hooked engagement in an apertured lug 248 which projects forwardly from the control arm hub 244, this lug being located at a point substantially opposite to the control arm 200. Thus, the continuous tension of the upper looped end of the biasing spring 225, in its reaction against the rotatable but non-shiftable mounting hub 228, tends to slide the slot-like opening 245 in such direction over the reduced neck portion 241 as to hold the control finger 200 projected outwardly to its maximum radius Z. That is to say, when the control arm 220 is in the full line position shown in Figure 8 the lower anchored end 227 of the spring 225 does not tend to pull the control arm 200 in a downward retracting direction, because the spring is looped around hub 228 which does not have sliding retractive movement with the control arm, and hence it is only the outward pull of the upper looped end 226 of the spring which resiliently retains the control arm normally thrust outwardly with the tip end thereof swinging through arc Z. The motion transmitting slot 243 and lug 246 are disposed on the opposite side of the assembly from the control arm 200 and the upper end of the tension spring 225 so that when the switch set shaft 33 is rotated in a counterclockwise direction as viewed in Figures 1, 8 and 9, the rotative movement of the slot 243 will transmit sliding reciprocatory movement to the lug 246 for pulling the control arm 200 and its hub 244 inwardly in a retracting direction against the tension of the wrap-around looped end 225' of the biasing spring 225 reacting against the non-shiftable hub 228. It will be understood that this only occurs when the control arm 200 is engaging against one of the stop surfaces 198s, 197s or 232s, resulting in the retraction of the nose 200' of the control arm to an inner radius where it clears the stop surface with which it is then in engagement, whereupon the tension spring 225 is immediately effective to snap the control arm 200 down to the next stop surface, or into engagement with the end stop lug 237. The range of retractive movement of the control arm 200 is not sufficient to clear the end stop lug 237, so that the control arm cannot go beyond this end position. By virtue of having the helical biasing spring 225 wrap around the mounting hub 228, as clearly shown in Figure 8, the tension of this upper wrap-around end 225' and hook 226 of this spring is always effective to maintain the control arm 200 and hub 244 projected outwardly to its position of maximum radius, irrespective of the stop which is then being engaged by the control arm. The control arm and its slotted hub 244 are axially confined on the reduced neck portion 241 by a confining washer 251 which is secured in place on the second reduced neck portion 242 by ring staking the latter or by inserting a headed confining pin in the bore of the mounting hub 228 with a drive fit. All automatic cyclical movements and all manual resetting movements of the control arm 200 are transmitted to the switch controlling cam, designated 255 in its entirety, through an actuating lug 253 which projects rearwardly from the hub portion 244 of the control arm.

Referring now to this switch operating cam, designated 255 in its entirety, it will be seen from Figures 10 and 13 that it comprises a hub portion 256 centrally bored to rotate on a pivot stud 258 which is anchored in the insulating panel 52 and projects forwardly therefrom. A centrally recessed front rim portion 259 on the cam fits over the confining washer 251, and this rim portion is provided with a radially extending slot 260 in its front face adapted to receive the actuating lug 253 which projects rearwardly from the hub 244 of control arm 200. Thus, the cam 255 rotates directly with the control arm 200 to assume all angular positions assumed by the control arm. Formed in the cam directly in back of the front rim 259 are four successive cam formations comprising a cam lobe 261, a valley 262, a cam lobe 263 and a valley 264 (Figure 13). These successive cam formations are adapted to engage a pin 266 projecting forwardly from a switch yoke 267. This switch yoke is of metallic construction and has its left hand edge notched out at 269 to have a rocking fit against a terminal post 271 which is anchored in the insulating panel 52. That portion of the terminal post 271 which projects forwardly from the insulating panel 52 is provided with peripheral grooves 272 in its upper and lower edges into which fit the edges of the notched opening 269 for establishing a rocker mounting of the yoke 267 on the terminal post 271. In the double throw embodiment of the switch illustrated, the yoke 267 is provided with contacts at each end, which alternately open and close. For example, the yoke is formed with an upwardly extending arm carrying a movable contact 274 which is adapted to engage a stationary contact 275 carried by a terminal post 276 anchored in the insulating panel 52. Adjacent to its lower end, the yoke 267 is formed with a lug 278 projecting outwardly from its right hand edge for receiving and centering a compression spring 279 which has its opposite end abutting against a spring retaining post 281 anchored in the insulating panel. The opposite contact of a double throw switch is obtained by providing the yoke 267 with a downwardly extending arm 282 carrying a movable contact 283 adapted to engage a stationary contact 284 carried by terminal post 285 anchored in the insulating panel 52. This arm 282 can can be in the form of a thin metallic strip having a slotted aperture 286 for engaging over the spring centering lug 278, and also having a bifurcated upper end 287 for embracing the right hand edge of the yoke at a point above the compression spring 279. It will be seen that the compression spring 279 holds this arm 282 in place with the slotted aperture 286 engaging over the lug 278 and with the bifurcated end 287 embracing the edge of the yoke. The pressure of the compression spring 279 also holds the notched opening 269 in the left hand edge of the yoke pressed into the grooves 272 in the upper and lower edges of the rocker terminal post 271. It will be seen that this switch can be assembled very quickly and easily by merely sliding the notched opening 269 of the yoke into the grooves of the post 271, the spring 279 thereafter retaining the switch yoke in place. Also, the switch can be readily converted from a double throw switch to a single throw switch by merely omitting the arm 282 and its movable contact 283, together with the cooperating stationary contact 284 and post 285. In the operation of this particular form of switch, the first cam lobe 261 holds the pin 266 and switch yoke 267 oscillated to the left in the first or "A" (automatic) position of the switch setting shaft 33; the cam valley 262 permits the pin 266 and switch yoke 267 to swing back to their normal or spring urged positions in the second or "C" (cooking) position of the switch setting shaft; the second cam lobe 263 oscillates the pin 266 and switch yoke 267 laterally to the left again for separating contacts 274, 275 in the third or "O" (off) position of the switch set shaft; and the cam valley 264 immediately following the cam hump 263 permits the pin 266 and switch yoke 267 to swing back again under spring pressure to again closes the contacts 274, 275 when the switch set shaft is in its fourth or "M" (manual) position. When the switch S is of the single throw type above described, the actuating cam 255 can take on two different forms, one cam being provided if the range manufacturer wants normally open contacts; the other cam being provided if the range manufacturer wants normally closed contacts. In the double throw embodiment of switch illustrated in Figure 13, the manufacturer can get normally open or normally closed contacts, depending upon which end of the switch arm he connects the control circuit to. It will be understood that the terminal posts 271, 276 and 285 have suitable provision on the back side of the insulating panel 52 for receiving electrical connections.

Referring now to the interval timer mechanism, this is preferably of the electromagnetic buzzer type which will start to sound upon the expiration of the preselected time interval, and will continue to sound until shut off. As best shown in Figures 2, 16, 17, 18, it comprises a vibratory reed or spring arm 291 carrying a hammer or armature 292 at its vibrating end which is adapted to respond to the alternating current electromagnetic field generated in the stator of the synchronous motor 35. The spring arm or reed 291 is preferably constructed as an integral part of the metallic bearing plate 58, the spring arm being integrally joined at its stationary end with the bearing plate through the connecting web 293, from which it will be seen that the spring arm is punched out as an integral extension of the bearing plate 58 in the same plane therewith, and is thereafter bent to a position at right angles to the edge of this bearing plate. This integral construction also affords a lower reluctance magnetic path from the vibratory reed through the bearing plate 58, screws 59, spacing posts 56 and metallic frame plate 51 to the lower side of the housing 177 of the synchronous motor 35.. The hammer or armature 292 extends through a slotted opening 295 in the upper portion of the motor housing, and is arranged to be vibrated by alternating current electromagnetic flux emanating from the stator winding of the synchronous motor. In this regard, the internal construction of the synchronous motor may be modified to cooperate with the vibratory buzzer assembly 291, 292 in the manner disclosed in the copending application of William P. Gallagher and Paul G. Bielik, Serial No. 421,396, filed April 6, 1954, issued June 26, 1956 as Patent 2,752,592 for obtaining a more efficient construction.

The vibratory reed and hammer are normally held suppressed against vibration through a relatively thin deflecing reed 297 which is secured to the vibrating end of the spring arm 291 and extends outwardly therefrom beyond this end. This vibration suppressing reed may be secured to the spring arm 291 by forming the hammer or armature 292 with the narrowed shank portion 292' which is passed through aligned slots in the suppression reed and in the spring arm and is staked over on the back side of the spring arm. The suppression spring 297 is normally held deflected inwardly toward the synchronous motor to hold the hammer or armature 292 pressed inward resiliently under sufficient pressure to prevent its audible vibration. This normal, non-sounding position of the vibrator assembly is maintained by a shut-off lever 301 which is pivotally mounted on a pivot pin 302 carried by the frame plate 58. The outwardly extending arm of this lever is formed with a laterally bent lug 303 which normally bears against the back side of the suppression spring 297 for resiliently holding the latter deflected inwardly toward the motor 35. The other arm of the shut-off lever carries a pin 304 which projects inwardly or forwardly of the frame plate 58 for cooperation with a cam wheel 305 arranged to be manually rotated by the internal timer shaft 42. This cam wheel 305 is staked to one end of a mounting hub 306, to the other end of which is staked a spur gear 307 of the sector or mutilated type having a toothless idling notch at one point in its periphery, as will be later described. The hub 306 is fixedly anchored to the rear portion of the interval timer shaft 42, the extremity of such shaft extending beyond the assembly 305—307 for bearing mounting in an aperture 309 (Figure 5) in the rear frame plate 58.

Referring more particularly to the peripheral formation of the cam wheel 305, it will be seen from Figure 16 that it is formed with two closely spaced humps 311 and 312, defining a notch 313 therebetween of substantially the same radius as the main peripheral portion of the cam wheel. The pin 304 which projects from the shut-off lever 301 normally sets in this notch 313, in which position of the pin the shut-off lever is deflected to hold the suppression spring pressed inwardly toward the motor in the non-sounding position of the interval timer. When the pin 304 is in this notch 313, the pointer 41 stands in the vertical position pointing to the "Off" designation on the interval timer scale 46. Spaced in a clockwise direction immediately beyond the notch 313 and trailing hump 312, is a relatively deep notch 314 in the cam wheel 305 which permits the tripping pin 304 to move inwardly to a smaller radius of the cam wheel than the periphery 315 and notch 313. When the pin 304 drops into the notch 314 it permits the shut-off lever 301 to retract to an inoperative position, out of engagement with the suppression reed 297. Thereupon the buzzer vibrator begins to sound, and will continue to sound until the interval timer knob 45 is turned clockwise through the relatively short angular distance necessary to swing the pin 304 out of the deep notch 314 into the relatively shallow notch 313. When the deep notch 314 is in registration with the pin 304 the pointer 41 of the interval timer is substantially in registration with the "O" point on the interval timer scale 46.

Referring to Figure 17, it will be seen that the gear 307 which transmits the timed drive to the interval shaft 42 is provided with an idling gap or arcuate space 321 in its periphery which is devoid of gear teeth 322. When the interval timer is set for operation, the gear teeth 322 are placed in mesh with the gear teeth 323 of a pinion 324 mounted on the drive shaft 176 which projects from the gear housing 177 of the electric motor unit 35. In the normal non-operative setting of the interval timer, the idling notch 321 is in registration with the teeth 323 of the driving pinion 324, so that no rotation is transmitted to the gear 307. As soon as the interval timer knob 45 is rotated in a clockwise direction to give a setting to the interval timer, the teeth 322 of the large gear 307 are rotated into mesh with the driving pinion teeth 323, the latter normally rotating continuously in a counterclockwise direction, as viewed from the front in Figure 17. The number of teeth 322 on the large gear which are thus manually turned into mesh with the driving pinion teeth 323 will depend upon the direction of setting rotation given the knob 45, and upon the length of time interval; i.e. if the knob 45 is rotated clockwise and if a long interval time is set, such as 50 minutes, only a few of the teeth 322 beyond the end 321' of the idling notch 321 are rotated into mesh with the driving pinion 324, whereas if a relatively short time interval is set up, such as 5 minutes, the majority of the teeth 322 are revolved through the line of mesh with the driving pinion, so that the point of mesh in such setting is near the opposite end 321" of the idling gap 321. The angular span between the points 321' and 321" of the idling gap 321 corresponds to the angular span between the "O" point and the "Off" point on the interval timer scale 46. That is to say, at the expiration of the preset time interval, when the deep notch 314 in the cam wheel comes into registration with the pin 304, the shut-off lever 301 is permitted to swing in such direction as to remove the back pressure against the suppression spring 297 and permit the vibrator spring and hammer to start vibrating. At the same time that the deep notch 314 moves into registration with the pin 304, the leading end 321" of the idling gap 321 comes into registration with the line of mesh between the pinion 324 and gear 307. Accordingly, the interval timer gear 307 ceases rotation, and continues to remain in this position as long as the housewife permits the interval timer to sound. When the housewife wishes to turn off the sounding of the interval timer she rotates the knob 45 to turn the interval timer pointer 41 into the vertical "Off" position. This rotates the cam wheel 305 in a clockwise direction through just the sufficient angular distance to force the pin 304 out of the notch 314 and up over the hump 312 for dropping into the shallow "Off" notch 313. The resulting downward movement given to the pin 304 swings the shut-off lever 301 in a clockwise direction (Figure 16) for bringing the lug 303 to bear against the back of the suppression spring 297 and thereby silence the vibrator. The interval timer gear 307 was advanced correspondingly with the cam wheel 305, but, as previously described, the angular span of the idling gap 321 is such that the trailing end 321' of the gap is still in registration with the pinion 324 so that no further driving rotation is transmitted to the gear 307. When the housewife wishes to set up a desired time on the interval timer she rotates the knob 45 in a clockwise direction or in a counterclockwise direction, as desired to bring the pointer 41 into registration with the marking of the desired time interval on the interval timer dial 46. Let us say, for example, that she desires to set the interval timer for a relatively short time interval of 5 minutes; she thereupon rotates the pointer into registration with the numeral "5," which is the position of the pointer shown in Figure 1. Such rotation of the pointer correspondingly rotates the cam wheel 305 and gear wheel 307, the positions of these two wheels shown in Figures 16 and 17 corresponding substantially to this 5 minute setting which the housewife has just given the interval timer pointer. From here on the time driven rotation of the gear wheel 307 and cam wheel 305 produce the sequence of events previously described.

Obviously, when the housewife imparts these setting adjustments to the interval timer through the knob 45, the drive pinion 324 must be capable of friction slippage or other temporary freedom of rotation relatively to the synchronous motor 35, in order to permit such setting of the large interval timer gear 307. This is preferably accomplished by the provision of a friction slippage clutch arrangement effective between the pinion 324 and the motor driven shaft 176. In our improved construction herein disclosed, we have combined with this friction slippage clutch arrangement a unique laterally deflectable mounting of the drive pinion 324 which permits this pinion to be deflected laterally in an outward direction from the gear 307; whereby, if there is any tendency for jamming between the teeth 322 on the large gear and the teeth 323 on the driving pinion because of end-to-end abutment between these teeth as the large gear is turned past the idling notch, such jamming will be avoided by the momentary lateral deflection of the pinion 324 to permit its teeth 323 to slip into the proper tooth spaces between the large gear teeth 322. As shown in Figure 18, the pinion 324 is formed with a raised hollow hub 325 which extends axially beyond the plane of the pinion teeth 323. This extended hub 325 has a large diameter cylindrical bore 326 therein which has a full size opening at its lower end (i.e. its end adjacent the pinion teeth), and which is substantially closed at its upper end by a transverse end wall 328. A central opening 329 in this end wall 328 has a relatively loose fit over the motor driven shaft 176 for the purpose of permitting cocking movement of the pinion relatively to the shaft. Extending up into the enlarged bore 326 is a conically shaped driving support 339 which rotates concurrently with the motor shaft 176. The large end of this conical member 339 has a rather close fit in the closed end of the bore 326, this large end of the cone having a flat end surface adapted to have frictional driving engagement against the inner surface of the transverse end wall 328. Fitting over the motor shaft 176 is a friction drive washer 343 which is maintained in frictional driving engagement with the outer surface of the transverse end wall 328 by a compression spring 346. The outer end of the compression spring 346 is held on the motor shaft 176 by an outer confining washer 347. It will thus be seen that the drive from the motor shaft 176 to the pinion 324 is solely through the frictional slippage surfaces or clutch construction established between the outer surface of the conical member 339 and the inner surface of the end wall 328, and also between the outer surface of the transverse end wall 328 and the inner surface of the friction washer 343, these friction slippage surfaces being maintained in spring pressed engagement at all times by the action of the compression spring 346.

Referring now to the ability of the pinion 324 to be displaced or cocked sidewise in the event of jamming between the pinion teeth 323 and the gear teeth 322, it will be seen that the reduced neck portion 351 of the conical support 339 lies at the outer end of the enlarged cylindrical bore 326. This reduced neck portion 351 permits the toothed end of the pinion hub to be cocked or tilted inwardly at an angle to the axis of the motor shaft, substantially as indicated in dotted lines in Figure 18. This enables the teeth 323 of the driving pinion 324 to be displaced away from the teeth 322 of the driven gear 307 a sufficient distance to prevent jamming as a result of end-to-end tooth contact, such lateral displacement of the pinion teeth permitting the necessary slippage between teeth to effect proper meshing. In this lateral cocking of the pinion, the flat inner surface of the transverse end wall 328 tips up at an angle relatively to the flat end surface of the conical support 339, but immediately upon proper mesh being established between the gear teeth of the two wheels, the pinion is restored to its normal axially aligned position by the action of the spring 346 forcing the transverse end wall 328 down into friction slippage engagement with the flat end wall of the conical support 339. This conical support 339 may be keyed or anchored to the motor shaft 176 in any desired manner and independently of any other elements on this motor shaft. However, for the purpose of reducing manufacturing and assembly costs, we preferably make this conical support 339 as an integral upward extension of the drive pinion 175 which has a keyed or drive fit on the motor shaft at 353. Thus, it will be seen that the above described construction provides the desired friction slippage clutch relation between the motor shaft 176 (or other drive shaft) and pinion 324, and also provides a resilient or yielding mounting of the pinion 324 on the motor shaft, or other drive shaft, of such nature as to permit the pinion to be deflected relatively to the motor shaft in the event of any jamming tendency between the pinion teeth and the teeth on the driven gear 322.

In Figures 14–15 we have illustrated a modified form of switch actuating cam 255a arranged to actuate a modified form of main control switch designated S'. This modified form of cam 255a consists of a metallic stamping with successive cam formations comprising a cam lobe 261a, a valley or depressed portion 262a, a cam lobe 263a and a valley or depressed portion 264a. This cam is mounted on the hub 228a, directly in front of the control arm 200, and is formed with a notch 351 in its periphery, at a point between the lobes 261a and 263a. Engaging in this notch 351 is the lug 248 which projects forwardly from the hub portion 244 of control arm 200, it being recalled that this lug 248 projects forwardly for connection to the helical biasing spring 225 (Figure 11). Thus, the engagement of the lug 248 in the notch 351 compels the cam 255a to rotate with the control arm 200, but permits the above described inward retraction of the control arm 200 when it is desired to manually free the control arm from the stops 197s, 198s, etc. In order to minimize surface friction between the back surface of the cam 255a and the front surface of the control arm hub 244, the cam stamping 255a may be formed with a plurality of rearwardly projecting humps or beads 353 which establish point contact at three or four points with the adjacent surface of the control arm hub 244 and thus minimize friction when this control arm is given its retractive sliding movement. The cam lobes 261a and 263a are adapted to have successive wiping contact against the forwardly extending arm 356 of a T-shaped switch rocker 357 composed of insulation. This insulating rocker member 357 has mounting on the inner surface of an insulating end panel 359 which is adapted to be secured by screws to the rearwardly bent lugs 54 of frame plate 51. The rocker member 357 is provided with outwardly projecting rocker lugs 361 at two points spaced across the width of the rocker, which lugs have rockable seating in apertures 362 in the insulating panel 359. Mounted on the outer face of the switch member 357, beyond the rocker axis, are two contact plates 364 each having laterally rockable mounting on the switch member 357. Each of these two movable contact plates 364 is adapted to bridge a pair of stationary contacts 367 which have anchored mounting in the insulating end panel 359. Each of the four stationary contacts 367 is mounted on the short leg of an L-shaped metallic terminal clip 371, the long leg of which clip is anchored at 373 to an insulating back plate 52a. This insulating back plate has the same mounting and attachment on the spacing posts 56 by the metallic bearing plate 58 as described of the other insulating back panel 52, this modified panel 52a merely being of shorter lateral dimension and having the right hand edge supported by the L-shaped terminal clips 371. This modified switch is normally held in closed position by a spring rod 376 having its outer end anchored in the insulating end panel 359 and extending inwardly through the switch rocker 357 for receiving a compression spring 378 which normally holds the switch rocker 357 pressed outwardly into switch closing position. As the lobes 261a and 263a of the switch actuating cam 255a move into rotary wiping engagement across the projecting arm 356 of the switch rocker 357 they cause the switch to rock to open position around the rocker axis defined by the rocker lugs 361. It will thus be seen that the same fundamental assembly and a large majority of the same parts employed in the previous embodiment illustrated in Figures 1–12 inclusive are retained in the modified embodiment of Figures 14 and 15 using the high capacity switch S'. The main substitutions are the rear insulating panel 52a with all of its switch parts 371, 359, 357, etc. mounted thereon, in lieu of panel 52 and all of its switch parts 266—285 mounted thereon; also the substitution of the different cam assembly 255a, etc. for the cam assembly 255. This high capacity switch is usually desirable for electrically heated ranges where the entire heating load passes through the timer switch.

It is conventional practice in most gas heated cooking ranges and electrically heated cooking ranges to provide a so-called "convenience outlet" on the clock or instrument panel of the range, into which can be plugged an electric coffee maker, a portable electric cooker or oven, or any other electrical appliance commonly used in the kitchen. This convenience outlet is usually electrically connected to the same range timer that controls the heating functions of the oven or other cooking parts. Thus, the convenience outlet may be given the same preset timing for fully automatic operation or for semiautomatic operation of the connected appliance. When thus using the convenience outlet instead of the range oven, the oven thermostat is placed in the "Off" position which insures that the oven will not be heated when current is supplied to the convenience outlet. Unless otherwise limited, the appended claims are to be construed as covering the timer controlling either the heating part or parts of the range, or controlling the energization of the convenience outlet.

When it is desired to supply the range manufacturer or other customer with the interval timer alone, the reduced assembly or sub-assembly designated "IT" in Figures 19, 20 and 21 is supplied. For example, the elements which would remain in this assembly of the interval timer alone would, of course, include the elements of the motor driven clock basic-assembly, such as the clock dial 21, clock hands 23 and 24, clock movement gearing 164, 181, 183, 142, 122, 116, etc., frame plate 51, rear bearing plate 58, electric motor 35, etc. In addition, it would include the interval timer parts, such as the interval timer pointer 41, shaft 42, knob 45, dial 46, front mounting plate 71, vibrator parts 291—297, vibrator control parts 301—351, etc. The parts which would be omitted in such interval timer sub-assembly would include the time selecting dials 26, 27 and 28 and their tripping pins 138 and 157, the tripping stops 191—197 and 192—198, the rotary switch control shaft 33 and switch control arm 200 and related parts, the switch actuating cam 255, the switch parts 266—285 (or switch parts 255a, 356, etc.), the rear insulating panel 52 (or 52a), etc. Since the time selecting dials 26, 27 and 28 are thus absent from this interval timer sub-assembly "IT," it is desirable to make the hour hand dial of larger diameter, as indicated at 25a, in order to fill the entire space within the large aperture 72 in the front mounting plate 71. The splined arbor 83 is retained in this interval timer assembly, and this modified hour hand dial 25a is mounted on the front end thereof, the same as the dial 25. A relatively thick spacing washer 379 is slipped over this splined arbor in back of the modified hour hand dial to fill some or all of the space occupied by the time selecting dials of the previously described embodiment. The same driving gear 116 is assembled over the splined arbor to bear against the back of the above spacing washer, and the same push type of lock washer 119 is forced over the splined arbor to abut the back side of the driving gear 116. Because of the long length of the pinion 122, the driving gear 116 retains mesh with this pinion even in its more forwardly advanced position. The minute hand assembly remains the same as in the previously described embodiment, this also being true of the interconnecting gearing between the hour hand and minute hand.

Referring now to the provision for the manual setting of the clock hands, the switch set shaft 33 and its surrounding sleeve 34 are substituted by a solid shaft 34a which is journaled in the frame plate 51 and in the front mounting plate 71. This shaft 34a carries a knob 31a at its front end, and secured to said shaft directly in front of frame plate 51 is a clock hand setting gear 142a which remains permanently in mesh with the clock hand adjusting gear 183. Thus, there is no axial shifting of the knob 31a, shaft 34a nor gear 142a, but otherwise the time setting function for adjusting the clock hands is performed the same as above described. Thus, it will be seen that a very large proportion of the same basic elements and parts that are employed in the combined range timer and interval timer are also employed in the reduced interval timer sub-assembly "IT," without requiring any change in the construction of these parts. The above described interval timer "IT" has, per se, been made the subject matter of divisional application Serial No. 739,647, filed May 20, 1958.

When it is desired to supply the range manufacturer or other customer with the range timer alone, the reduced assembly or sub-assembly designated "RT" in Figures 22, 23 and 24 is supplied. For example, the elements which would remain in this assembly of the range timer alone would, of course, include the elements of the motor driven clock basic-assembly, such as the clock dial 21, clock hands 23 and 24—25, clock movement gearing 164, 181, 183, 142, 122, 116, etc., frame plate 51, rear bearing plate 58b, electric motor 35, etc. In addition, it would include the range timer parts, such as the time selecting dials 26, 27, 28 and their tripping pins 138 and 157, the tripping stops 191—197 and 192—198, the rotary switch control shaft 33 and switch control arm 200 and related parts, the switch actuating cam 255, the switch parts 266—285 (or switch parts 255a, 356, etc.), the rear insulating panel 52 (or 52a), etc. The parts which would be omitted in such range timer alone would include the interval timer pointer 41, shafts 42, knob 45, dial 46, vibrator parts 291—297, and vibrator control parts 301—351. In this reduced range timer assembly "RT," the front mounting plate 71b would be identical with the previously described plate 71, except that it would not have the interval timer scale 46. Alternatively, for the range manufacturer who wishes to supply his own front clock dial arrangement, the front mounting plate 71 may be eliminated entirely, or substituted by an angle bracket which has attachment to the basic assembly by the screws 66 and which affords a front bearing support for the shaft 33 and sleeve 34 comparable to that afforded by the front frame plate 71. Since the interval timer shaft 42, and its pointer 41 and knob 45 are absent from the assembly in this range timer assembly "RT," the minute hand shaft may, if desired, be in the form of a solid shaft, as indicated at 161b, with its rear end journaled in the bearing opening 309 of the rear bearing plate 58b. The latter bearing plate 58b is identical with the rear bearing plate 58 except that it has the vibratory spring portion 291 omitted or cut off. Here again, it will thus be seen that a very large proportion of the elements and parts that are employed in the basic construction of the combined range timer and interval timer are used in the range timer sub-assembly "RT," without any change in the construction of these parts.

While we have illustrated and described what we regard to be the preferred embodiments of our invention, nevertheless it will be understood that such are merely exemplary and that numerous modifications and rearrangements may be made therein without departing from the essence of the invention.

We claim:

1. In a time switch, the combination of contact apparatus, control means governing said contact apparatus, said control means being adapted to be moved from a normal position to a set position, means normally tending to cause a return motion of said control means from said set position back toward said normal position, normally stationary tripping stops disposed in the path of such return motion, a continuously rotating time driven member, time selecting dials normally rotating continuously with said time driven member but capable of being adjusted to different angular time settings relatively thereto, a time indicating numerical scale rotating with one of said time selecting dials, indexing means rotating with another of said dials and cooperating with the time indicating scale rotating with said first dial, manual means for effecting such different angular time settings of said dials, and tripping members on said dials adapted in the continuous rotating movement of said dials to engage said normally stationary tripping stops and to actuate them into releasing positions for releasing said control means.

2. In a time switch, the combination of electrical contact apparatus, cam means for actuating said contact apparatus, a pivotally swinging control arm governing said cam means, said control arm being adapted to be moved from a normal position to a set position, spring means normally tending to cause a return motion of said control arm from said set position back toward said normal position, a plurality of normally stationary tripping stops disposed at different points in the path of such return movement of said arm, a clock dial, a continuously rotating time indicating member revolving concentrically of said clock dial, two time selecting dials mounted concentrically of said clock dial, friction means normally rotating said time selecting dials continuously with said time indicating member, but permitting said time selecting dials to be adjusted to different angular time settings relatively to said time indicating member and to each other, manual means for effecting such different angular time settings of said time selecting dials, and tripping lugs on said time selecting dials moving through radially spaced paths in the normally continuous rotary movement of said time selecting dials, which radially spaced paths intersect said normally stationary tripping stops, whereby said tripping lugs engage and release said tripping stops to in turn release said control arm at the times preselected by the settings given said time selecting dials.

3. In a time switch, the combination of contact apparatus, a pivotally swinging control arm governing said contact apparatus, a setting spindle through which said control arm is adapted to be moved from a normal position to a set position, spring means normally tending to cause a return motion of said control arm from said set position back toward said normal position, normally stationary tripping stops disposed in the path of such return motion, a continuously rotating time driven member, two time selecting dials both normally rotating continuously with and concentrically of said time driven member but capable of being adjusted to different angular time settings relatively thereto, manual means for effecting such different angular time settings of said two dials, tripping members on said dials adapted in the continuous rotary movement of said dials to engage said normally stationary tripping stops and to actuate them into releasing positions for releasing said control arm, and means operated in response to manual actuation of said setting spindle for causing said control arm to be retracted from engagement with one of said tripping stops for further motion of said control arm in a direction toward its normal position.

4. In a time switch, the combination of electrical contact apparatus, cam means for actuating said contact apparatus, a rotatable shaft connected with said cam means and rotating around a fixed axis, a pivotally swinging control arm connected with said shaft to rotate about said fixed axis, a manual setting knob associated with said shaft and adapted to be actuated for moving said control arm from a normal position to a set position, spring means normally tending to cause a return motion of said control arm from said set position back toward said normal position, a plurality of normally stationary tripping stops disposed at different points in the path of such return movement of said arm, said arm having a normal radius of swing intersecting said tripping stops, a clock dial, a continuously rotating time indicating member associated with said clock dial, time selecting dials normally rotating continuously with and concentrically of said time indicating member but capable of being adjusted to different angular time settings relatively thereto, manual means for effecting such different angular time settings of said time indicating dials, tripping members on said dials rotating through circular paths which intersect said normally stationary tripping stops for actuating said stops into releasing positions and thereby releasing said control arm at the preselected times, and means operative in response to manual actuation of said manual setting knob in a direction toward said normal position for reducing the radius of swing of said control arm relatively to said fixed axis of said rotatable shaft to enable said control arm to clear a tripping stop with which it may then be engaged.

5. In a time switch, the combination of electrical contact apparatus, cam means for actuating said contact apparatus, a pivotally swinging control arm governing said cam means, said control arm being adapted to be moved from a normal position to a set position, spring means normally tending to cause a return motion of said control arm from said set position back toward said normal position, a plurality of normally stationary tripping stops disposed at different points in the path of such return movement of said arm, spring means normally holding each tripping stop in a stop position capable of blocking movement of said control arm in a direction toward said normal position, a clock dial, a continuously rotating time indicating member revolving concentrically of said clock dial, two time selecting dials mounted concentrically of said time indicating member, means normally rotating said time selecting dials continuously with said time indicating member when said dials are preset to different angular time settings but permitting said time selecting dials to be adjusted to different angular time settings relatively to said time indicating member and to each other, manual means for effecting such different angular time settings of said time selecting dials, said manual means being rotatably mounted on an axis spaced from the axis of said time selecting dials, gear means operatively connecting said manual means with one of said time selecting dials, and tripping lugs on said time selecting dials rotating through circular paths which intersect said normally stationary tripping stops for actuating said tripping stops against the bias of their respective spring means for moving said stops into releasing positions and thereby releasing said control arm for switch controlling operation at the preselected times.

6. In a time switch, the combination of contact apparatus, control means governing said contact apparatus, said control means being adapted to be moved from a terminal position to a set position, means normally tending to cause a return motion of said control means from said set position back toward said terminal position, normally stationary tripping stops disposed in the path of such return motion, a clock dial, a time driven member rotating concentrically of said clock dial, an hour hand mounted concentrically of said clock dial and normally driven by said time driven member, a time selecting switch closing dial and a time selecting switch opening dial both mounted concentrically of said hour hand and frictionally coupled to said time driven member so as to normally rotate with said hour hand in its continuous rotation, a manually operated time selecting knob rotatably mounted on an axis spaced from the axis of said hour hand, gear means operatively connecting said time selecting knob with said time selecting switch closing dial, a tripping pin projecting from said switch opening dial, means cooperating with said tripping pin transmitting adjusting motion from said switch closing dial to said switch opening dial, a tripping pin projecting from said switch closing dial, said two tripping pins rotating in circular paths of different radii intersecting said normally stationary tripping stops for actuating said stops into releasing positions and thereby releasing said control means at the preselected times, and cooperating indicia carried by said switch closing dial and by said switch opening dial for indicating the duration of the preselected time interval established by the angular settings given to said time selecting dials.

7. In timing mechanism, the combination of a clock dial, an hour hand dial time driven to rotate concentrically of said clock dial and provided with an hour hand cooperating with said clock dial, said hour hand dial comprising a sight window therein, a stop cooking dial mounted concentrically in rear of said hour hand dial and normally rotating therewith, said stop cooking dial being provided with a scale of numerals adapted to appear in the sight window of said hour hand dial, a cooking hours dial and mounted concentrically in rear of said stop cooking dial and normally rotating therewith, said cooking hours dial having a sight window therein, a masking dial mounted concentrically in rear of said cooking hours dial and normally rotating therewith, said masking dial being provided with a scale of numerals adapted to appear in the sight window of said cooking hours dial, manual presetting means for setting said cooking hours dial and said stop cooking dial in different angular relationships to said hour hand dial, means for causing said masking dial to rotate concurrently with said stop cooking dial in such manual presetting adjustments, a start tripping member rotating with said cooking hours dial, a stop tripping member rotating with said stop cooking dial, a switch, and switch actuating mechanism responsive to said start and stop tripping members for closing and opening said switch at the preselected times.

8. In timing mechanism, the combination of a clock dial, an hour hand dial time driven to rotate concentrically of said clocks dial and provided with an hour hand cooperating with said clock dial, said hour hand dial comprising a sight window therein, a stop cooking dial mounted concentrically in rear of said hour hand dial and normally rotating therewith, said stop cooking dial being provided with a scale of numerals adapted to appear in the sight window of said hour hand dial, a cooking hours dial mounted concentrically in rear of said stop cooking dial and normally rotating therewith, said cooking hours dial having an arcuate sight window therein, a masking dial mounted concentrically in rear of said cooking hours dial and normally rotating therewith, a color band and a scale of numerals on the front face of said masking dial adapted to appear in the arcuate sight window of said cooking hours dial, means for manually setting said cooking hours dial and said stop cooking dial in predetermined angular relationships to said hour hand dial for predetermining the start and stop of the cooking operation, means for causing said masking dial to rotate concurrently with said stop cooking dial in the performance of such manual presetting operation for causing a selected one of the numerals on the front face of said masking dial to register with one end of said arcuate sight window, means on said stop cooking dial for covering or uncovering different lengths of said color band viewable through said arcuate sight window depending upon the preselected cooking hours time, a start tripping member rotating with said cooking hours dial, a stop tripping member rotating with said stop cooking dial, a switch, and switch actuating mechanism arranged to be successively tripped by said start tripping member and by said stop tripping member for predetermining the closing and opening of said switch at the preselected times.

9. In timing mechanism, the combination of a switch, switch control mechanism cooperating therewith for performing switch closing and switch opening control functions, a continuously rotating time driven member, an index member rotating therewith, a first time selecting dial normally rotating concurrently with said time driven member and having first indicia thereon adapted to be placed in registration with said index member to denote the selected time when one of said switch control functions is to occur, tripping means rotating with said first time selecting dial for effecting one tripping of said switch control mechanism at such preselected time, a second time selecting dial normally rotating concurrently with said time driven member and having a sight window therein in which is adapted to appear second indicia denoting the selected time when the other of said switch control functions is adapted to occur, tripping means rotating with said second time selecting dial for effecting the other tripping of said switch control mechanism at the preselected time, manual presetting means for setting said first and second time selecting dials in different time selecting angular relationships, and means having time driven movement and also manual presetting movement concurrently with said first time selecting dial for presenting said second indicia in the proper indicating relationship in the sight window of said second dial.

10. In timing mechanism, the combination of a switch, switch control mechanism cooperating therewith, tripping stops cooperating with said switch control mechanism for causing the latter to perform switch closing and switch opening control functions, a continuously rotating time driven member, a registering member rotating therewith, a first time selecting dial normally rotating concurrently with said time driven member and having first indicia thereon adapted to be placed in predetermined registration with said registering member to denote the selected time when one of said switch control functions is to occur, tripping means rotating with said first time selecting dial for tripping one of said tripping stops at the preselected time, a second time selecting dial normally rotating concurrently with said time driven member and having an arcuate sight window therein in which is adapted to appear second indicia and a color band denoting the selected length of time that said switch is to remain in one of its positions, tripping means rotating with said second time selecting dial for tripping the other tripping stop at the preselected time, manual presetting means for setting said first and second time selecting dials in different time selecting angular relations to said time driven member and to each other, and means having time driven movement and manual presetting movement concurrently with said first time selecting dial and comprising said second indicia and a color band which are presented in the sight window of said second dial, said latter means causing the length of color band visible in said arcuate sight window to be increased or decreased depending upon the setting given said second time selecting dial.

11. In apparatus of the class described, the combination of a frame structure, a clock dial carried thereby, a bearing carried by said frame structure concentric of said clock dial, a splined arbor rotatably mounted on said bearing, means for driving said arbor continuously at a timed rate, a clock hand concentric of said arbor rotating therewith, a plurality of time selecting dials having non-splined mounting on said arbor so as to be capable of rotation relatively to said arbor, friction disks having anchored mounting on said splined arbor for rotation therewith, for frictionally driving said time selecting dials from said arbor, at least one of said dials and one of said disks being axially slidable along said arbor, spring means adapted to maintain resilient frictional engagement between said friction disks and said dials for normally driving the latter concurrently with said arbor, manual means for angularly adjusting said dials relatively to said arbor, tripping means moving with said dials, a switch, and switch control means responsive to said tripping means for controlling said switch.

12. In a time switch, the combination of switch contact apparatus, control means governing said contact apparatus, manual means for manually moving said control means in one direction from a terminal position to a set position, spring means normally tending to cause a return motion of said control means in the opposite direction from said set position back toward said terminal position, normally stationary tripping stops disposed in the path of such return motion, a continuously rotating time driven member, concentrically mounted rotatable time selecting dials, a time indicating scale rotating with one of said time selecting dials, indexing means rotating with another of said time selecting dials and cooperating with said time indicating scale, friction drive means normally driving said dials from said time driven member, said friction drive means enabling said dials to be manually adjusted to different switch closing and switch opening time settings relatively to said time driven member, following which said friction drive means resumes the normal rotative driving of said time selecting dials through their respective time settings, manual means for effecting such different angular time settings of said dials, and tripping members on said dials adapted in the continuous rotary movement of said dials to engage said normally stationary tripping stops and to actuate them into releasing positions for releasing said control means.

13. In a time switch, the combination of electrical contact apparatus, cam means for actuating said contact apparatus, a pivotally swinging control arm governing said cam means, said control arm being adapted to be moved from a normal position to a set position, spring means normally tending to cause a return motion of said control arm from said set position back toward said normal position, a plurality of normally stationary tripping stops disposed at different points in the path of such return movement of said arm, spring means normally holding each tripping stop in a stop position capable of blocking movement of said control arm in a direction toward said normal position, a clock dial, a continuously rotating time indicating member revolving concentrically of said said clock dial, two time selecting dials mounted concentrically of said time indicating member and clock dial, friction drive means normally driving said dials from said time driven member, said friction drive means enabling said dials to be manually adjusted to different contact closing and contact opening time settings relatively to said time driven member, following which manual settings said friction drive means resumes the normal rotative driving of said time selecting dials through the time lapses of their respective time settings, manual means for effecting such different angular time settings of said time selecting dials, said manual means being rotatably mounted on an axis spaced from the axis of said time setting dials, gear means operatively connecting said manual means with one of said time selecting dials, and tripping lugs on said time selecting dials rotating through circular paths which intersect said normally stationary tripping stops for actuating said tripping stops against the bias of their respective spring means for moving said stops into releasing positions and thereby releasing said control arm for contact controlling operation at the preselected times.

14. In timing mechanism, the combination of a switch, rotatable control means governing said switch, manual means for manually rotating said control means in one direction from a terminal position to a set position, spring means normally tending to cause a return rotation of said control means in the opposite direction from said set position back toward said terminal position, a plurality of tripping stops operative to intercept such return rotation at a plurality of spaced points, a clock dial, a time driven member, hour and minute clock hands driven by said time driven member and rotating concentrically of said clock dial, switch closing and switch opening time selecting dials both mounted for coaxial rotation concentrically of said clock dial, a time indicating scale rotating with one of said time selecting dials, indexing means rotating with another of said time selecting dials and cooperating with said time indicating scale, manual means for setting said two time selecting dials at the preselected times desired for the closing and the opening of said switch, means for transmitting rotary movement from said time driven member to said two time selecting dials, means responsive to said time selecting dials for actuating said tripping stops, an interval timer shaft extending axially of said clock hands and of said manually presettable switch controlling dials, an interval timer pointer carried by said shaft to rotate concentrically of said clock dial and of said manually presettable switch opening and switch closing dials, means for manually rotating said interval timer shaft and pointer from an off position to a selected time measuring position, interval timer scale indicia concentric of said clock dial for indicating the setting given said interval timer pointer, time driven means for rotating said interval timer shaft from said selected time measuring position back to an interval terminating position, and interval termination responsive means adapted to respond when said interval timer shaft arrives in said interval terminating position.

15. In a time switch, the combination of electrical contact apparatus, cam means for actuating said contact apparatus, a pivotally swinging control arm governing said cam means, said control arm being adapted to be moved from a normal position to a set position, spring means normally tending to cause a return motion of said control arm from said set position back toward said normal position, a plurality of normally stationary tripping stops disposed at different points in the path of such return movement of said arm, spring means normally holding each tripping stop in a stop position capable of blocking movement of said control arm in a direction toward said normal position, a clock dial, a continuously rotating time driven member, contact closing and contact opening time selecting dials both mounted for coaxial rotation concentrically of said clock dial, manual means for setting said two time selecting dials at the pre-selected times for the closing and opening of said contact apparatus, said manual means being rotatably mounted on an axis spaced from the axis of said time setting dial, gear means operatively connecting said manual means with one of said time selecting dials, means for transmitting rotary movement from said time driven member to said two time selecting dials, and tripping lugs on said time selecting dials rotating through circular paths which intersect said normally stationary tripping stops for actuating said tripping stops against the bias of their respective spring means for moving said stops into releasing positions and thereby releasing said control arm for contact controlling operation at the pre-selected times.

16. In timing mechanism of the class described, the combination of an electric clock comprising a clock dial and hour and minute clock hands rotating concentrically of said clock dial, a range timer comprising an electric switch, a pivotally swinging control arm governing said switch, said control arm being adapted to be moved from a normal position to a set position, spring means normally tending to cause a return motion of said control arm from said set position back toward said normal position, a plurality of normally stationary tripping stops disposed at different points in the path of such return motion of said control arm, a plurality of time selecting dials rotatably mounted concentrically of said clock dial and clock hands, manual adjusting means for effecting different angular time settings of said time selecting dials, a time driven member, friction drive means normally driving said dials continuously from said time driven member, said friction drive means enabling said dials to be manually adjusted by said manual adjusting means to establish different switch closing and switch opening time settings relatively to said time driven member, following which manual settings said friction drive means resumes the normal rotative driving of said time selecting dials through the time lapses of their respective time settings, tripping lugs rotated by said time selecting dials through paths which intersect said normally stationary tripping stops for moving said stops into releasing positions and thereby releasing said control arm for effecting switch operation of said range timer at the preselected times, an interval timer comprising an interval timer shaft extending axially of said clock hands and of said time selecting dials, an interval timer pointer carried by said shaft to rotate concentrically of said clock dial, manual means for manually rotating said interval timer shaft and pointer from an off position to a selected time measuring position, interval timer scale indicia concentric of said clock dial for indicating the setting given said interval timer pointer, audible means responsive to the motion of said interval timer shaft from the selected time measuring position back to a sounding position for audibly indicating the expiration of the present time interval, and a single electric motor operatively connected to drive the clock hands of said clock, the time driven member of said range timer, and the interval timer shaft of said interval timer.

17. In a combined automatic time switch and interval timer, the combination of a time driven member, a clock dial, hour and minute clock hands driven by said time driven member and rotating concentrically of said clock dial, a switch, rotatable control means governing said switch, spring means urging the rotation of said control means in one direction, normally stationary tripping stop means operative to block the spring urged rotation of said control means, a manually presettable switch closing dial and a manually presettable switch opening dial both disposed concentrically of said clock dial and both normally continuously driven by said time driven member, tripping means normally driven continuously with said dials and presettable therewith to the different time selected settings of said dials, said tripping means being operative to actuate said normally stationary tripping stop means to control the closing and opening of said switch at the preselected times, an interval timer shaft extending axially of said clock hands and of said manually presettable switch controlling dials, an interval timer pointer carried by said shaft to rotate concentrically of said clock dial and of said manually presettable switch opening and switch closing dials, means for manually rotating said interval timer shaft and pointer from an off position to a selected time measuring position, interval timer scale indicia concentric of said clock dial for indicating the setting given said interval timer pointer, time driven means for rotating said interval timer shaft from said selected time measuring position back to an interval terminating position, and interval termination responsive means adapted to respond when said interval timer shaft arrives in said interval terminating position.

18. In timing mechanism of the class described, the combination of an electric clock comprising a clock dial and hour and minute hands rotating concentrically of said clock dial, an electric switch, cam means for operating said switch, a rotatable setting shaft rotating around a fixed axis and operating said cam means, a control arm connected to rotate with said setting shaft, said control arm being adapted to be manually rotated from a normal position to a set position, biasing spring means normally tending to rotate said shaft and control arm in a spring-biased direction from said set position back toward said normal position, said shaft and control arm having the following four positions in sequence in rotating in said spring-biased direction: first, said set position in which the switch is open; second, a switch closed position; third, a switch open position; and fourth, said normal position in which the switch is closed; a first normally stationary tripping stop coacting with said control arm for controlling the rotation of said shaft from said first position to said second position, a second normally stationary tripping stop coacting with said control arm for controlling the rotation of said shaft from said second position to said third position, a plurality of time selecting dials rotatably mounted concentrically of said clock dial and clock hands, manual adjusting means for effecting different angular time settings of said time selecting dials, a time driven member, friction drive means normally driving said dials continuously from said time driven member, said friction drive means enabling said dials to be manually adjusted by said manual adjusting means to establish different switch closing and switch opening time settings relatively to said time driven member, following which manual settings said friction drive means resumes the normal rotative driving of said time selecting dials through the time lapses of their respective time settings, tripping lugs rotated by said time selecting dials through paths which intersect said normally stationary tripping stops for moving said stops into releasing positions and thereby releasing said control arm for effecting switch operation at the preselected times, and means for operating said setting shaft to release said control arm from said third position to enable said biasing spring means to continue the rotation of said setting shaft from said third position to said fourth or normal position.

19. In timing mechanism of the class described, the combination of a time driven member, an electric switch, cam means for actuating said electric switch, a setting shaft for actuating said one cam means, said setting shaft being rotatable about a permanently fixed axis of rotation, a switch tripping control member rotatable with said setting shaft and adapted to be rotated manually in one direction of rotation from a normal position to a set position, spring means normally tending to cause a return motion of said setting shaft and said control member in the opposite direction of rotation from said set position back toward said normal position, tripping stop means in the path of such return direction of rotation of said control member, a switch closing time selecting member, a switch opening time selecting member, means responsive to the settings given to said time selecting members for actuating said tripping stop means to permit the spring urged return rotation of said setting shaft and control member at the selected times, an inner hub on said setting shaft, an outer hub on said switch tripping control member, said outer hub having a slot therein which engages over said inner hub and permits substantially radial shifting movement of said control member relatively to said setting shaft, a tooth extending from one of said hubs, and a tooth space formed in the other of said hubs and engaging over said tooth, whereby manually actuated rotation of said setting shaft in its spring impelled direction of rotation is operative to effect radial shifting movement of said control member to shorten the effective radial length thereof relatively to the fixed axis of said shaft for clearing said tripping stop means.

20. The combination of claim 19 wherein said spring means comprises a helical tension spring having one end anchored to a relatively stationary point of attachment, said spring extending therefrom and being wrapped in a partial loop around said inner hub and having its other end anchored to said outer hub, so that said tension spring tends to normally hold said control member projected outwardly to its position of maximum radial length from the fixed axis of said shaft.

References Cited in the file of this patent

UNITED STATES PATENTS

| | | |
|---|---|---|
| 761,699 | Ney et al. | June 7, 1904 |
| 1,602,260 | Hicks | Oct. 5, 1926 |
| 1,982,495 | Browning | Nov. 27, 1934 |
| 2,034,178 | Flegel | Mar. 17, 1936 |
| 2,056,400 | Holtz | Oct. 6, 1936 |
| 2,200,110 | Andersen | May 7, 1940 |
| 2,202,721 | Andersen | May 28, 1940 |
| 2,253,929 | Campbell | Aug. 26, 1941 |
| 2,300,950 | Lux | Nov. 3, 1942 |
| 2,301,942 | Gallagher | Nov. 17, 1942 |
| 2,439,732 | Haydon | Apr. 13, 1948 |
| 2,485,195 | Gallagher et al. | Oct. 18, 1949 |
| 2,545,617 | Kaefer et al. | Mar. 20, 1951 |
| 2,607,188 | Bourquin | Aug. 19, 1952 |
| 2,619,558 | Gallagher et al. | Nov. 25, 1952 |
| 2,657,283 | Harris | Oct. 27, 1953 |
| 2,663,786 | Illian et al. | Dec. 22, 1953 |